US012469069B2

United States Patent
Nelson et al.

(10) Patent No.: US 12,469,069 B2
(45) Date of Patent: Nov. 11, 2025

(54) SYSTEM, NON-TRANSITORY COMPUTER-READABLE MEDIUM, AND METHOD FOR FACILITATING CONTACTLESS DRIVE UP ORDER FULFILLMENT

(71) Applicant: Target Brands, Inc., Minneapolis, MN (US)

(72) Inventors: Theodore Nelson, Minneapolis, MN (US); Slade Baumann, Minneapolis, MN (US); Jathin Jayan, Minneapolis, MN (US); Syed G. H. Mohammed, Minneapolis, MN (US); Andria Rambow, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 280 days.

(21) Appl. No.: 18/124,385

(22) Filed: Mar. 21, 2023

(65) Prior Publication Data

US 2023/0298087 A1 Sep. 21, 2023

Related U.S. Application Data

(60) Provisional application No. 63/321,888, filed on Mar. 21, 2022.

(51) Int. Cl.
*G06Q 30/00* (2023.01)
*G06Q 30/0601* (2023.01)

(52) U.S. Cl.
CPC ..... *G06Q 30/0635* (2013.01); *G06Q 30/0643* (2013.01)

(58) Field of Classification Search
CPC .............. G06Q 30/0635; G06Q 30/0643
See application file for complete search history.

(56) References Cited

U.S. PATENT DOCUMENTS

| | | | |
|---|---|---|---|
| 9,721,301 B2* | 8/2017 | Cook | G06Q 30/0283 |
| 10,157,364 B1 | 12/2018 | Koeppel et al. | |
| 10,373,226 B1 | 8/2019 | Russell et al. | |
| 10,417,691 B2 | 9/2019 | Agarwal et al. | |
| 10,464,106 B1* | 11/2019 | Mo | B65G 1/1373 |
| 10,482,421 B1* | 11/2019 | Ducrou | G06V 20/54 |
| 2017/0293991 A1* | 10/2017 | High | G01G 19/387 |

(Continued)

OTHER PUBLICATIONS

H. Abbu, D. Fleischmann and P. Gopalakrishna, "The Case of Digital Transformation in Grocery Business: A Conceptual Model of Digital Grocery Ecosystem," 2021 IEEE International Conference on Engineering, Technology and Innovation (ICE/ITMC), Cardiff, United Kingdom, 2021, pp. 1-9, (Year: 2021).*

(Continued)

*Primary Examiner* — Arielle E Weiner
(74) *Attorney, Agent, or Firm* — Fish & Richardson P.C.

(57) ABSTRACT

A network based order fulfillment systems having an improved user interface at both a customer device and at an order fulfillment location employee device. Both customer and employee devices can collect user input using unique user interface elements to elicit input from a customer in a retail environment on proper placement of items for an order in a vehicle. The unique user interface elements can be customized based on information specific to the user's vehicle. The elicited user input can be used to update a user interface of a second computing device.

20 Claims, 10 Drawing Sheets

Customer's Device

(56) References Cited

U.S. PATENT DOCUMENTS

2018/0276739 A1* 9/2018 Chopp ............... G06Q 10/0837
2020/0234380 A1* 7/2020 Dulori ............... G06Q 30/0283
2021/0065104 A1* 3/2021 Lee .................. G06Q 10/0832

OTHER PUBLICATIONS

Ref U Continued: doi: 10.1109/ICE/ITMC52061.2021.9570219 (Year: 2021).*

* cited by examiner

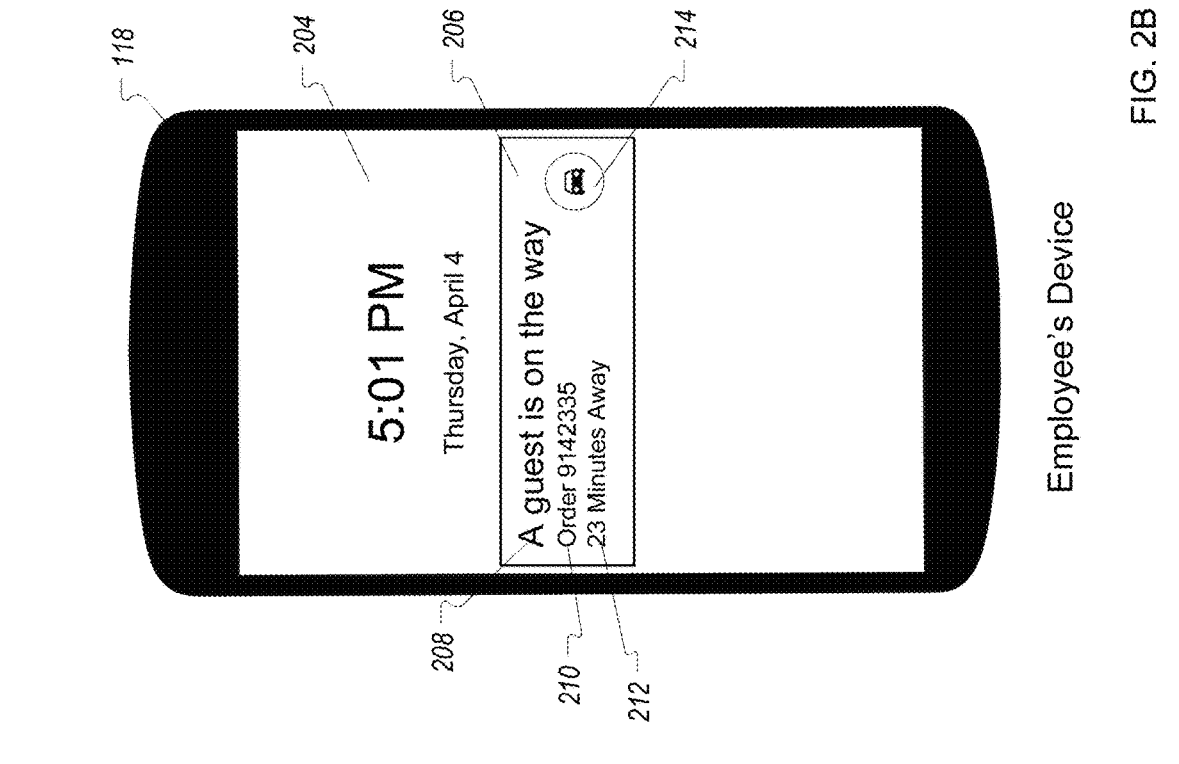
FIG. 2B  Employee's Device
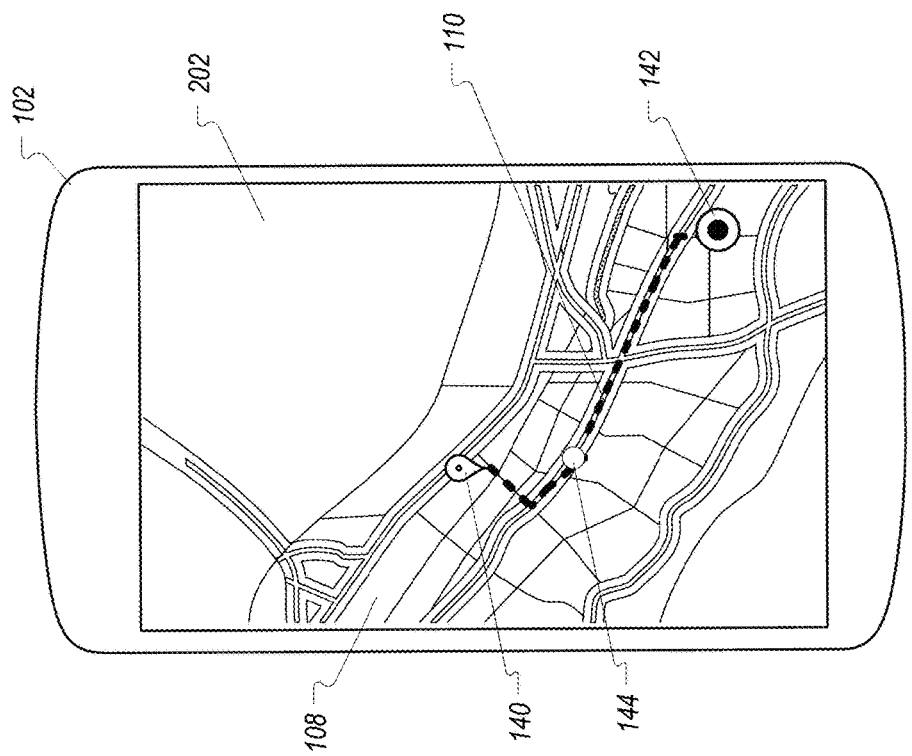
FIG. 2A  Customer's Device

Employee's Device

Customer's Device

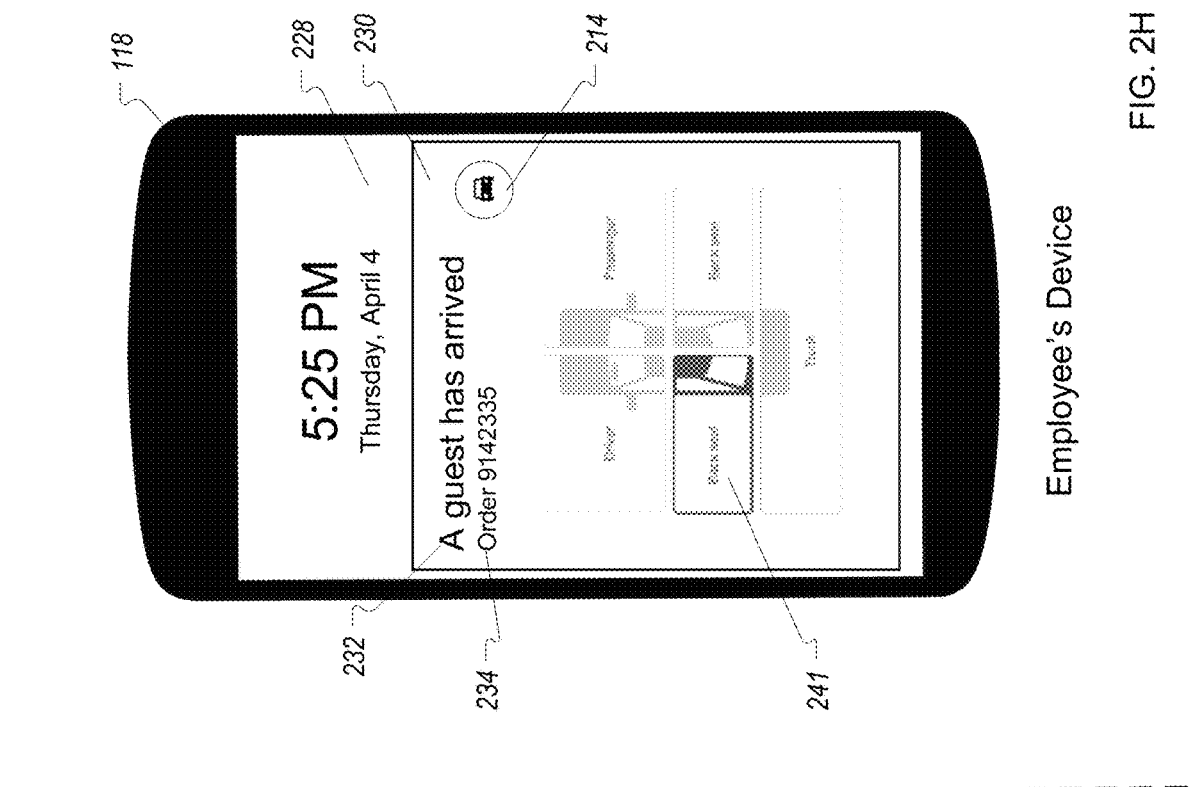
FIG. 2H Employee's Device
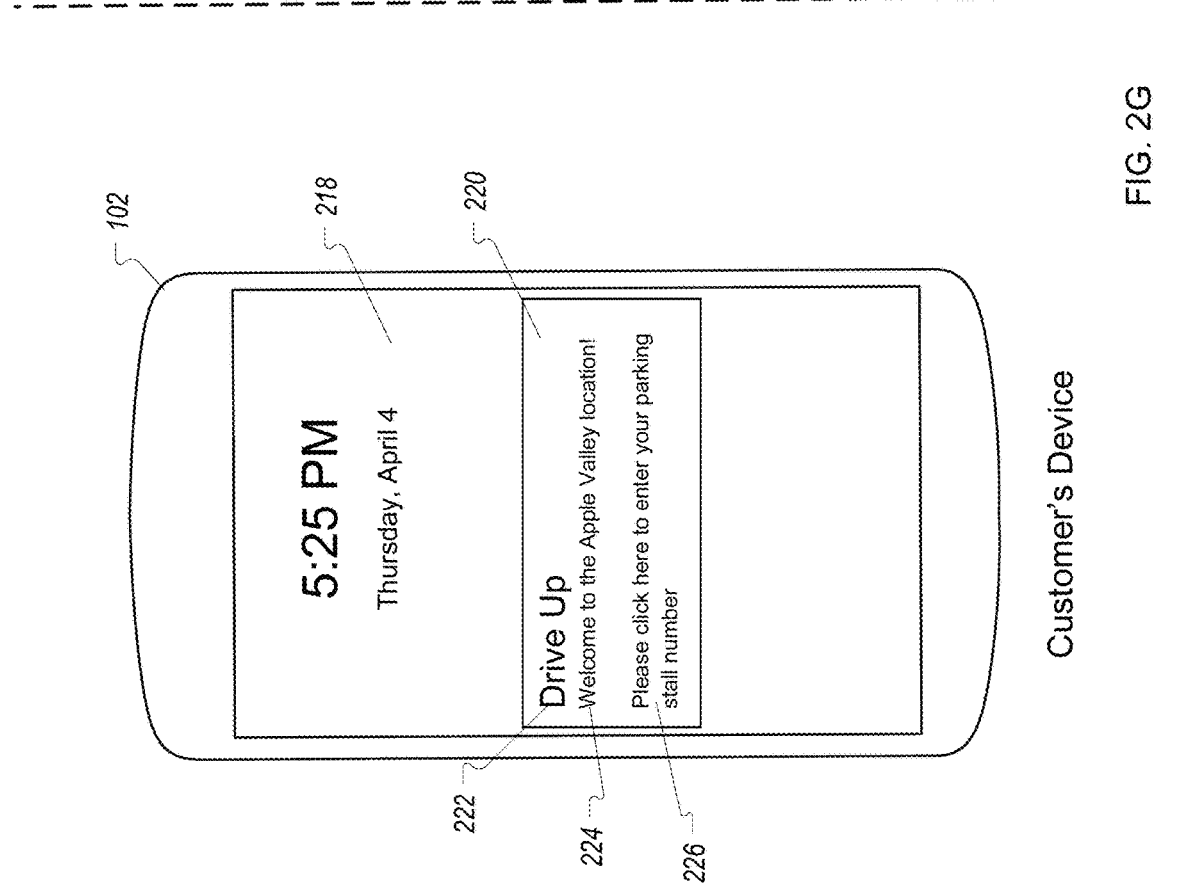
FIG. 2G Customer's Device

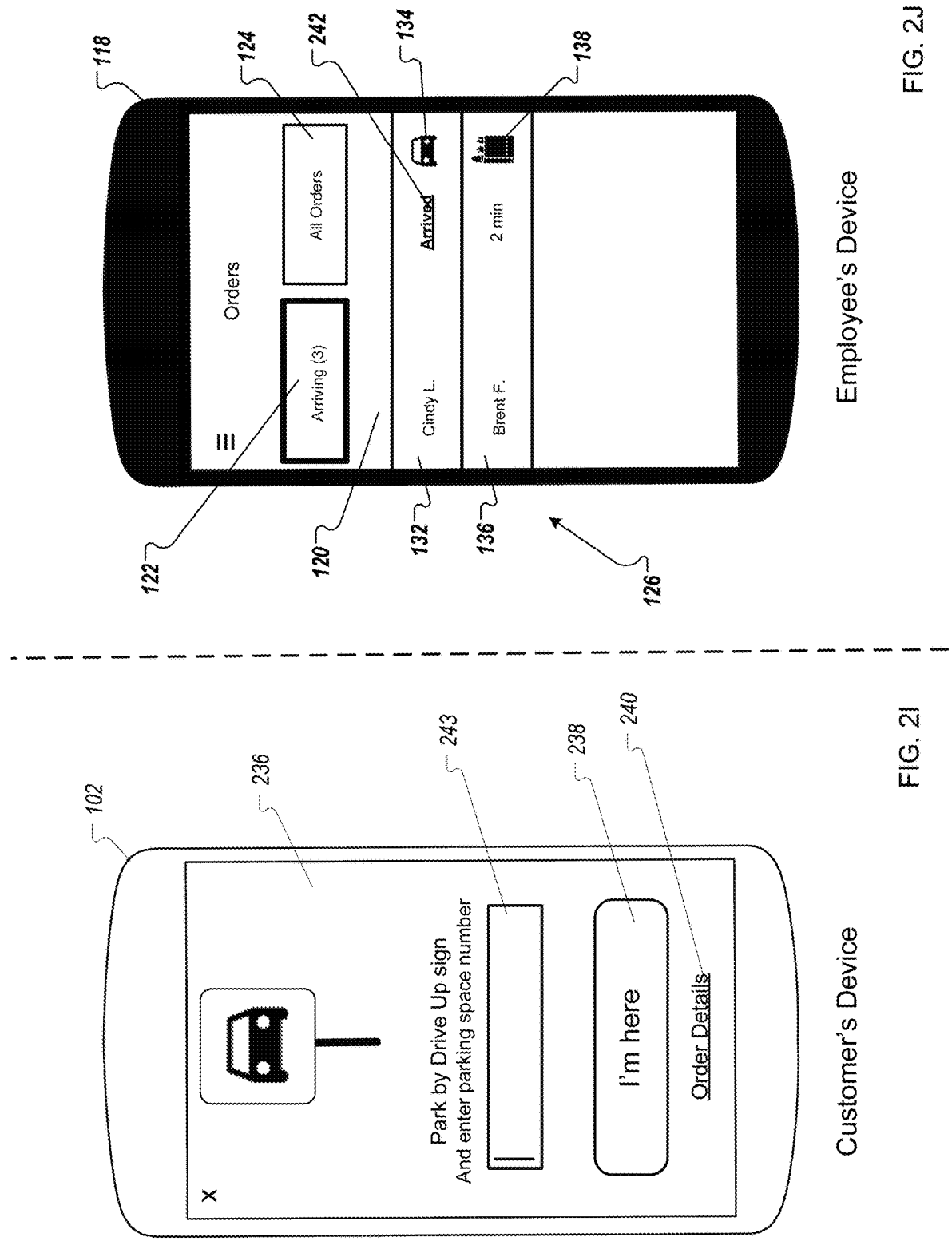

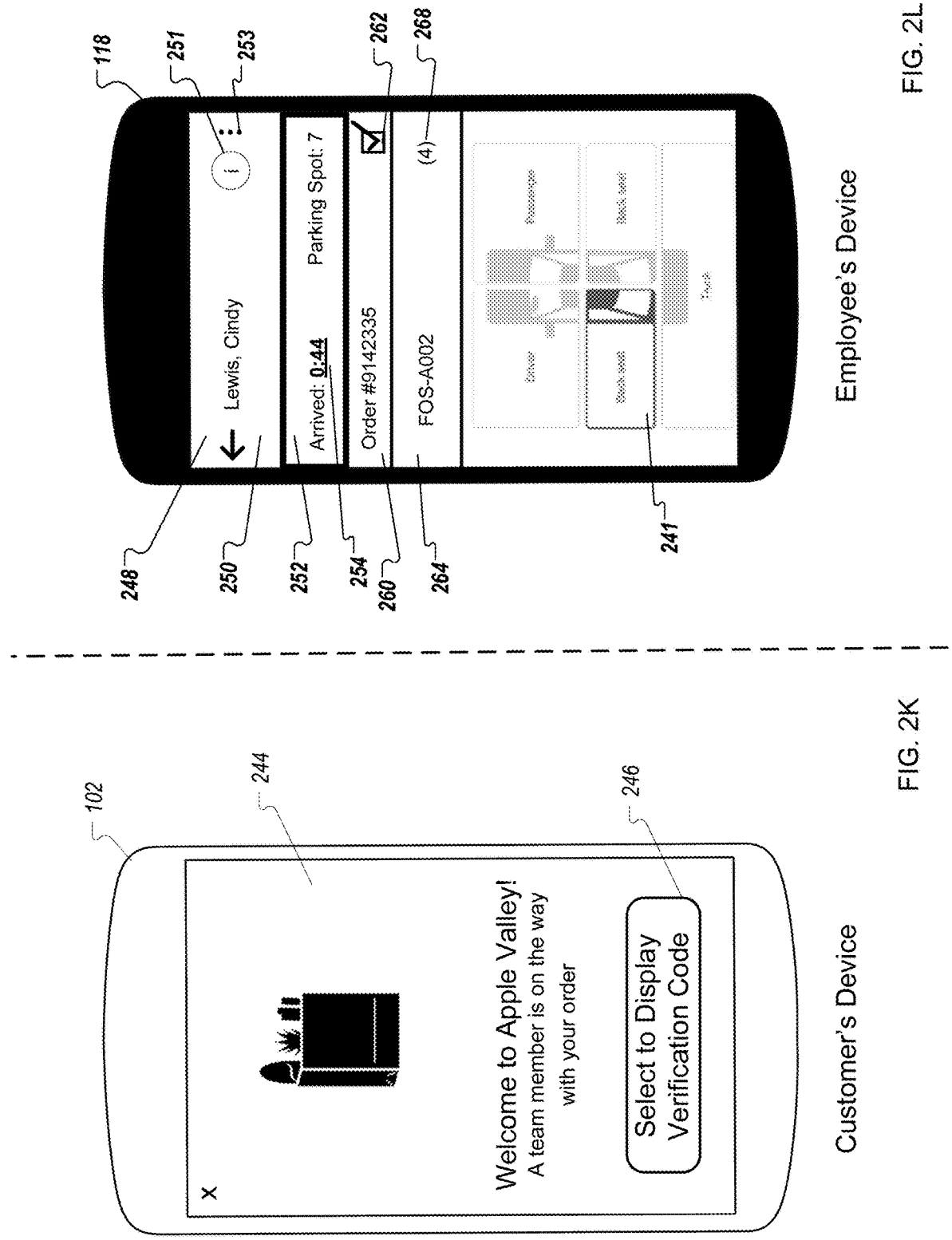

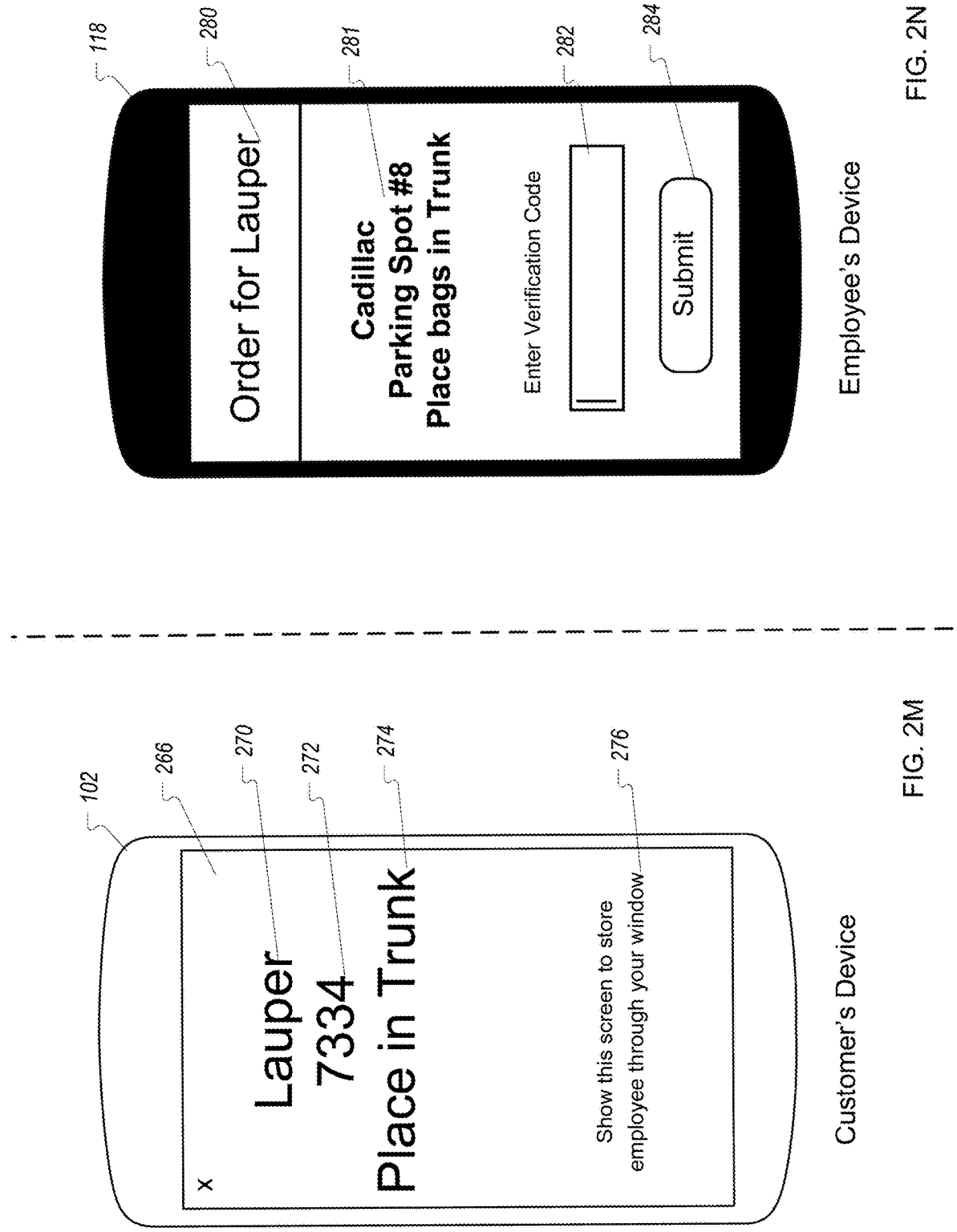

SYSTEM, NON-TRANSITORY COMPUTER-READABLE MEDIUM, AND METHOD FOR FACILITATING CONTACTLESS DRIVE UP ORDER FULFILLMENT

CROSS-REFERENCE TO RELATED APPLICATIONS

This application claims the benefit of U.S. Patent Application Ser. No. 63/321,888, filed on Mar. 21, 2022. The disclosure of the prior application is considered part of (and is incorporated by reference in) the disclosure of this application.

TECHNICAL FIELD

This document generally relates to architecture of computer systems, communications between computing devices, and graphic user interfaces for eliciting user input.

BACKGROUND

Computing devices are devices that accept data input, process the data, and provide data output using hardware and software. Computing devices can communicate with other computing devices using wired or wireless networks or a combination thereof. For example, computing devices can communicate over the Internet. User interactions with a computing device can cause the computing device to transmit communications to a second computing device, which can cause the second computing device to provide output such as changes to a visual display, sounds, or tactile output. Such output at the second computing device can elicit user input from a user of the second computing device which can in turn cause the second computing device to transmit one or more communications to the first computing device thereby causing the first computing device to generate additional output.

SUMMARY

This document generally describes a network based order fulfillment systems that provides information to one or more user devices that allow users of the user devices located at a fulfillment location (such as a physical store location, a restaurant, a warehouse, or other location) to fulfill orders placed by users of other user devices while minimizing or eliminating physical proximity of employees of the fulfillment location and users who have placed orders. For example, a first user device can collect user input and other information using one or more input mechanisms of the first user device to identify a location within a vehicle of the user where bags and/or items included in an online order are to be placed by an employee of a fulfillment location. In some instances, user input indicating the location within the vehicle where bags and/or items are to be placed is elicited by a user interface displayed on the first user device. In some instances, the user interface is customized based on information provided by the user, information detected by the first user device, and/or information retrieved from remote computing systems. The first user's device can provide the information representing the selection of a location to place bags and items in the first user's vehicle to a user device of a worker at a fulfillment location to allow the worker to fulfill the order in a timely manner while minimizing or eliminating close physical proximity of the worker and the first user, which can, for example, reduce the risk of spreading airborne diseases.

As another example, the first user device can receive input from the first user indicating items that the first user wishes to purchase from a store, the first user's progress in traveling to the store, and other information about the first user and the first user's order. The first user's device can provide this information to a user device of a worker at a fulfillment location to allow the worker to fulfill the order in a timely manner and provide the items in the order to the first user upon arrival of the first user at the fulfillment location. The worker can interact with her user device to cause the worker's device to update a status of the order and provide information to the first user's device which can cause the first user's device to provide additional information to the first user. In one aspect, the first user's device can provide a user interface that includes a unique optically recognizable code (e.g., a barcode or a matrix barcode) that can be used to verify the first user's identity, the first user's order number, or other information associated with the first user or the order. The worker's device can provide instructions to the first user for scanning, or otherwise verifying, the optically recognizable code. The worker can then use her device to scan the optically recognizable code displayed by the first user's device to verify the first user's identity or an aspect of the first user's order. Alternatively, the first user's device can display a human readable code (e.g., numeric code or alphanumeric code) that the first user can show to the worker through a window of the user's vehicle to reduce or eliminate the need for the worker to be within close physical proximity of the first user. The worker can view the human readable code displayed on the first user's device and enter the code into the worker's device to verify the identity of the first user and ensure that the items for the order are being delivered to the correct person.

In one aspect, in general, a method includes receiving, by a first computing device, user input initiating an online ordering process; receiving, by the first computing device, user input indicating selection of one or more items for inclusion in an online order; receiving, by the first computing device, user input indicating submission of the online order; in response to receiving the user input indicating submission of the online order, providing, by the first computing device, a first user interface, the first user interface including a plurality of user selectable controls, each of the plurality of user selectable controls representing a different portion of a vehicle; receiving, by the first computing device, an indication of user selection of one of the plurality of user selectable controls; and in response to receiving the indication of user selection of the one of the plurality of user selectable controls, transmitting information to a computing system indicating a location within a vehicle.

In some implementations, the method can optionally include one or more of the following features. The plurality of user selectable controls can include a first user selectable control corresponding to a passenger side of the vehicle; a second user selectable control corresponding to a driver's side of the vehicle; and a third user selectable control corresponding to a trunk of the vehicle. The plurality of user selectable controls can include a first user selectable control corresponding to a front driver's side portion of the vehicle; a second user selectable control corresponding to a front passenger side portion of the vehicle; a third user selectable control corresponding to a rear driver's side portion of the vehicle; a fourth user selectable control corresponding to a rear passenger's side of the vehicle; and a fifth user selectable control corresponding to a trunk of the vehicle. The first user selectable control can include a graphic depiction of the front driver's side portion of the vehicle. The second user selectable control can include a graphic depiction of the front passenger side portion of the vehicle. The third user selectable control can include a graphic depiction of the rear driver's side portion of the vehicle. The fourth user selectable control can include a graphic depiction of the rear passenger's side of the vehicle. The fifth user selectable control can include a graphic depiction of the trunk of the vehicle.

Each of the plurality of user selectable controls can include a graphic depiction of the corresponding different portion of the vehicle for that user selectable control. In response to receiving the indication of user selection of the one of the plurality of user selectable controls, the method can include changing an appearance of the one of the plurality of user selectable controls on the first user interface. Changing the appearance of the one of the plurality of user selectable controls on the first user interface can include changing a color of the one of the plurality of user selectable controls. The method can further include accessing information on a vehicle type of the vehicle. The method can further include customizing each of the plurality of user selectable controls based on the accessed information on the vehicle type of the vehicle. The method can further include accessing information on a vehicle make and model of the vehicle. The method can further include customizing each of the plurality of user selectable controls based on the accessed information on the vehicle make and model of the vehicle.

The systems, devices, program products, and processes described throughout this document can, in some instances, provide one or more of the following advantages. By providing streamlined communications between mobile devices operated by users/customers and employees working at fulfillment locations, an order fulfillment system can reduce the amount of time spent interacting with the mobile devices, thereby reducing power consumption and improving battery life of the computing devices. Additionally, by streamlining communications while providing for computer network based ordering and pick-up facilitation, the computing system can reduce the amount of communications to and from mobile computing devices, thereby reducing bandwidth usage of one or more communications networks and freeing up communications bandwidth for other purposes. Additionally, the unique user interface elements described here can reduce the physical interaction and physical proximity between customers and employees in a retail environment thereby reducing the risk of spread of communicable, airborne diseases. Additionally, unique user interface elements at mobile computing devices of both users/customers and employees of fulfillment locations can improve user experience thereby leading to improved outcomes with respect to efficiency and accuracy of both user interactions with the mobile computing devices and fulfillment of orders. Other benefits and advantages will be apparent from the following descriptions.

DESCRIPTION OF DRAWINGS

Like reference symbols in the various drawings indicate like elements.

DETAILED DESCRIPTION

Figure 1:
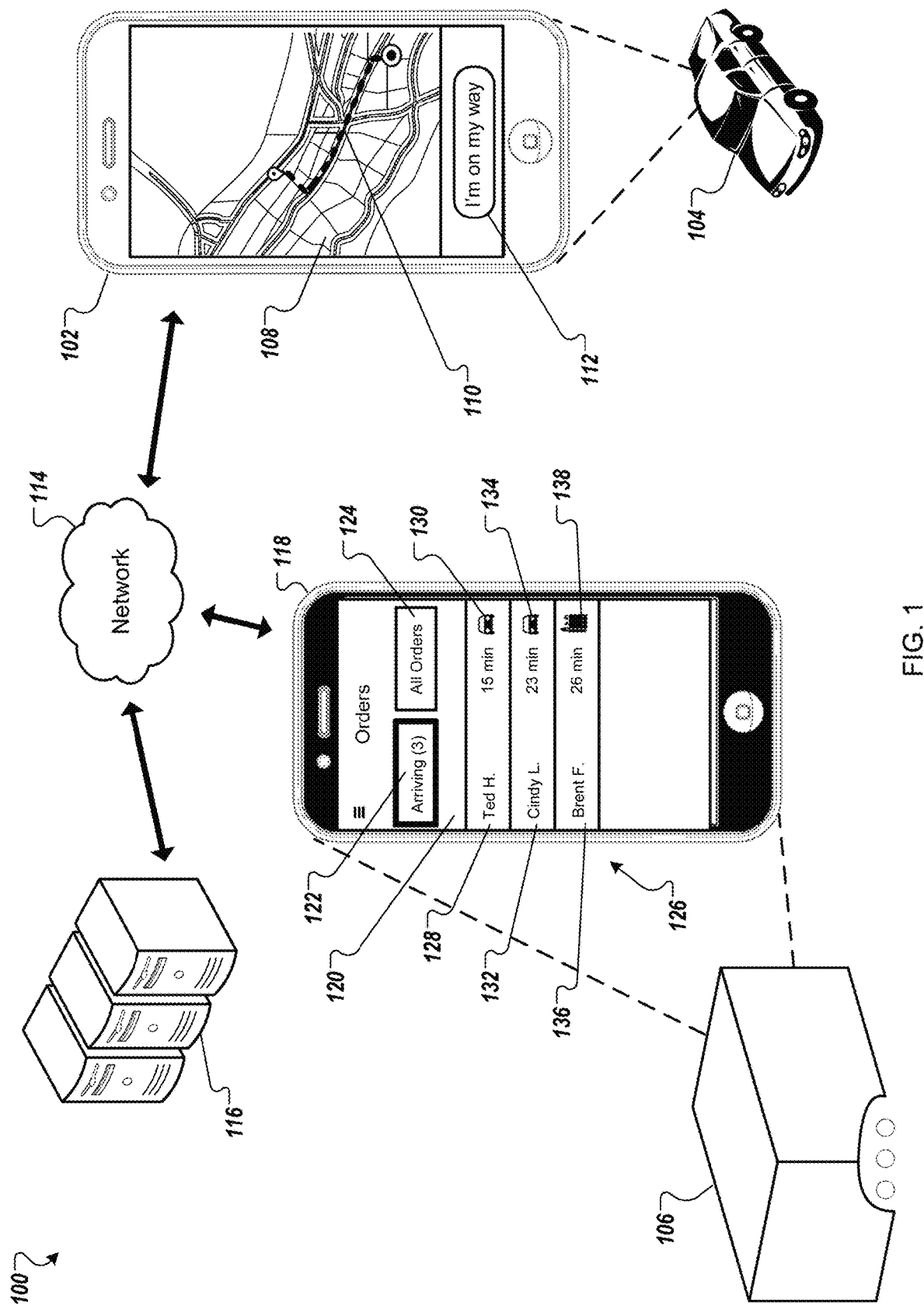
FIG. 1 is diagram of an example system for facilitating drive-up order fulfillment.

FIG. 1 is a diagram of an example system 100 for facilitating order fulfillment for drive-up pickup by user's. In the system 100, a user, such as a customer who wishes to complete an online order for items by picking up the items using a drive-up service, can access a dedicated application executing on a mobile device 102. The mobile device 102 can be, for example, a mobile phone, a tablet device, a touch screen computer, a laptop computer, a PDA, a smart watch, or other mobile device. In some implementations, instead of accessing a dedicated application executing on the mobile device 102, the user can use a browser of the mobile device 102 to access a website that provides the below described functionality and therefore all descriptions related to use of the dedicated application apply equally to a web-based implementation.

The user logs into the dedicated application by entering a user name or other identifier and a password. Alternatively, the user can log into the dedicated application by providing biometric information using one or more sensors of the mobile device 102 such as by scanning a fingerprint using a fingerprint scanner of the mobile device 102 or using a retina scanner of the mobile device 102 to scan the user's retina information. In some implementations, the user may be already logged into the dedicated application from a previous session.

The user can use the dedicated application to select items for purchase from a store using an online shopping interface. For example, the dedicated application can be a grocery shopping application that can permit the user to search and/or browse for grocery items, add desired items to a virtual shopping cart, and place an order for the selected items by entering payment information. The user can also use the dedicated application to access one or more previously entered orders. For example, a user may have previously logged into an online account for a retailer associated with the dedicated application and placed an on-line order for one or more items using either the mobile device 102 or a different computing device such as a home or laptop computer. As another example, the user may have previously placed an on-line order using the dedicated application. The user can access and review the previously placed orders after logging into the dedicated application. This can include reviewing items included in the orders, estimated time until the order is ready, payment used for the order (e.g., "card ending in 123"), a fulfillment location for the order, and other information associated with the orders.

The mobile device 102 can communicate with other computing devices through a network 114, such as, for example, the Internet. For example, the mobile device 102 can communicate with a network access point such as a WiFi router or a cellular communication tower to access the network 114 and communicate with other computing devices. For example, the mobile device 102 can communicate with a server system 116 consisting of one or more servers to place the order. Alternatively, or additionally, the user can use a different computer to place the order and the different computer can communicate through the network 114 with the server system 116. The server system 116 can be affiliated with a retailer and process the on-line order received from the mobile device 102 or another computing device. The server system 116 can facilitate fulfillment of the order by providing details of the order, such as ordered items, identity of the user, an order number, time that the order was placed, etc. to one or more computing devices located at a fulfillment center such as a store 106. For example, the store 106 can be part of a chain of affiliated stores associated with a retailer and the server system 116 can be a server system associated with the retailer. Upon receiving an on-line order from the user, the server system 116 can identify the store 106 as an appropriate fulfillment location for the order based on information such as, an indication of a preferred location for fulfillment indicated by the user at the mobile device 102 or another computing device, a current location of the mobile device 102, another location associated with the user (e.g., home or work address information entered by the user into a customer profile), based on item availability (e.g., by identifying a store where all or a majority of the items in the order are in stock), or based on a combination of these and one or more other factors.

The server system 116 can transmit information on the order to a computing device 118 in the possession of, or being used by, an employee of the store 106. The computing device 118 can be a mobile computing device, such as, for example, a mobile phone, a tablet device, a touch screen computer, a laptop computer, a PDA, a smart watch, or other mobile device. In some implementations, the computing device 118 can be a non-mobile or semi-mobile device such as a server, a desktop computer, a cash register, a smart TV, or other computing device. The server system 116 can provide appropriate information for the order to the computing device 118 such as items in the order, identifying information for the user who placed the order, time the order was placed, a desired pickup time for the order (e.g., as indicated by the user at the time of placing the order), an order number, and other relevant information.

At the time of placing the order, or at a different time, such as when logging into the dedicated application, the user of the mobile device 102 can indicate a desired order fulfillment method for the order. For example, the user can specify that the order is for drive-up fulfillment. A drive-up fulfillment allows the user to drive to a fulfillment location, such as a retail store location, a warehouse, or another location where an employee of the retailer can meet the user at the user's vehicle 104, verify that the user is receiving the proper order, and provide the items to the user without the user being required to exit his vehicle. For example, the user can travel to the store 106, park in a designated area of the parking lot of the store 106, notify an employee that they have arrived (as described in more detail below), and then receive the purchased items from the employee when the employee brings the items to the user's vehicle 104. Alternatively, the user can specify that the order is for in-store pickup fulfillment or for delivery fulfillment.

As described in greater detail below with respect to FIGS. 2A-2N, in cases in which the user has opted for drive-up fulfillment, the dedicated application can provide one or more user interfaces to elicit input from the user indicating a location within the user's vehicle to place bags and/or items for the order within the user's vehicle 104 when the user arrives at the fulfillment location 106. The user can interact with the one or more user interfaces to, for example, indicate that the items should be placed in the backseat of the user's vehicle 104 via the rear passenger side door. As another example, user can interact with the one or more user interfaces to, for example, indicate that the items should be placed in a truck bed of the user's vehicle 104.

In some cases, when the user has indicated drive-up or in-store pickup type order fulfillment, the dedicated application can provide navigation directions, such as driving directions, to the fulfillment location (e.g., store 106). For example, the dedicated application can communicate with a native routing application installed on the mobile device 102 or with one or more remote routing servers to identify a route from either the user's current location or a specified starting location to the store 106. As another example, the mobile device 102 can communicate with the server system 116 through the network 114 to receive routing information from either the user's current location or the specified starting location to the store 106. The dedicated application can then, for example, provide a map display 108 showing a route 110 to the store 106. As another example, the dedicated application can provide turn by turn directions to the store 106 using text and/or icons in addition to or in place of the map display 108.

In some implementations, the user can permit the dedicated application to access location information for the mobile device 102. For example, the user can set a permissions setting permitting the dedicated application to access location information for the mobile device 102. In some implementations, the user can specify that the dedicated application is only permitted to access location information for the mobile device 102 when the dedicated application is executing or can specify that the dedicated application is always permitted to access location information for the mobile device 102 even when a user interface for the dedicated application is not open. The mobile device 102 can determine its own location using one or more well-known techniques, such as by using a GPS module for receiving GPS signals from GPS satellites to determine the location of the mobile device 102. The mobile device 102 can also use a wireless communication triangulation technique to determine the location of the mobile device 102. As another example, the mobile device 102 can determine its location based on the location of a network access point that the mobile device 102 is in short range wireless communication with (e.g., a WiFi router). The dedicated application can use the location information to identify a starting location for the route 110, such as the current location of the mobile device 102. In some implementations, location information determined by the mobile device 102 is used to determine that the mobile device 102 has begun to travel along the route 110. Alternatively or additionally, the user can select a user interface control 112 provided by the dedicated application to indicate that he has begun traveling toward the store 106.

Upon determining that the user has begun to travel toward the store 106, the mobile device 102 can communicate with one or more computing devices located at and affiliated with the store 106, either directly through the network 114 or by communicating with the server system 116 which in turn communicates appropriate information and instructions to the one or more computing devices located at the store 106. For example, an employee of the store 106 can use the computing device 118, which can receive information relevant to the order from the server system 116. The mobile device 102 can communicate with the server system 116 over the network 114 to indicate to the server system 116 that the user has begun to travel toward the store 106. The server system 116 can then provide a communication to the computing device 118 of the store employee to indicate that the user of the mobile device 102 is on the way. The server system 118 may communicate directly with the computing device 118 through the network 114 or may communicate with a computing device/system located at the store 106 which then communicates with the computing device 118, e.g., through a wireless or wired local area network (LAN). In some implementations, the server system 116 or a central computing device located at the store 106 can communicate with the computing device 118 and one or more other computing devices in possession of other employees of the store 106 to allow multiple employees to receive information on on-line orders placed by customers and coordinate efforts to fulfill such orders.

The server system 116 can provide additional information along with this notification or prior to sending the notification that the user is on the way. For example, the server system 116 can access user profile information to identify a make and model for the user's vehicle 104, a color for the user's vehicle 104, and/or other identifying information for the user's vehicle 104 (such as a whole or partial license plate number) and provide this vehicle identification information to the computing device 118 to allow the employee to more easily identify the user's vehicle 104 when the user has arrived at the designated drive-up fulfillment location at the store 106. The server system 116 can store this vehicle identification information as part of a customer profile for the user or the user can provide the information at the time of placing the order (e.g., in situations where the user is part of a multi-car family and may use different vehicles on different occasions). In some implementations, the server system 116 can store information on multiple vehicles in association with the user's profile. The user can be prompted to select which pre-stored vehicle that they will be using for a particular order pickup, for example, at the time of placing the order or at the time that user indicates that they are on their way to pick up the order.

In some implementations, the user can be prompted to enter such vehicle identification information at the time of placing the order, at the time of selecting drive-up fulfillment for the order, or at the time of indicating that they are on their way. For example, the dedicated application can present a GUI for eliciting vehicle identification information to the user at the time of placing the order, or in response to the user selecting drive up fulfillment or indicating that he is on his way. The GUI can provide user selectable graphics that allow the user to indicate different aspects of the vehicle such as color or vehicle type (e.g., SUV, sedan, mini-van, etc.). The GUI can also provide one or more text fields that allow the user to enter information on the vehicle such as a make and model for the user's vehicle 104, a color for the user's vehicle 104, and/or other identifying information for the user's vehicle 104 (such as a whole or partial license plate number).

In addition to information on the user's vehicle, the server system 116 can also provide information to the employee on a location within the user's vehicle to place items for the order to the computing device 118. For example, the server system 116 can access user profile information to identify a pre-stored, preferred item placement location for the user and provide this item placement preference information to the computing device 118 to allow the employee to readily identify a location within the user's vehicle to place the items for the order when the user has arrived at the designated drive-up fulfillment location at the store 106. The server system 116 can store this preferred item placement information as part of the customer profile for the user or the user can provide the information at the time of placing the order (e.g., the user may prefer different bag placement locations within his vehicle based on various factors such as the size of the order, whether the user has passengers in the vehicle at the time of picking up the order, other items currently being located within the user's vehicle, time of year, weather, etc.). In cases where the user has multiple vehicles associated with his profile, the server system 116 can store a preferred item placement location for each vehicle (for example, the user may prefer the back seat on the driver's side for a sedan and the rear of the vehicle for an SUV). In some implementations, rather than this information being stored at the server system 116, preference information such as preferred item placement information or descriptive information regarding the user's vehicle 104 can be stored locally on the user's mobile device 102. For example, the dedicated application can store this information in memory of the mobile device 102. In cases where the user has multiple vehicles, the dedicated application can store a preferred item placement location for each vehicle (for example, the user may prefer the back seat on the driver's side for a sedan and the rear of the vehicle for an SUV). Upon subsequent uses of the dedicated application, the dedicated application can present this stored item placement preference information to the user to allow the user to accept or change the item placement preference for a particular order.

In some implementations, alternatively to such item placement preference information being pre-stored with the user's profile, the system prompts the user to enter such item placement location preference information at the time of placing the order, at the time of selecting drive-up fulfillment for the order, at the time of indicating that they are on their way, or at the time that the user arrives at the fulfillment location. For example, the dedicated application can present a GUI for eliciting item placement location preference information to the user at the time of placing the order, in response to the user selecting drive up fulfillment, in response to the user indicating that he is on his way, or in response to the system determining that the user has arrived at the fulfillment location. The GUI can provide user selectable graphics that allow the user to indicate one or more areas of the vehicle that items for the order should be placed. In some implementations, the GUI is customized based on information on the vehicle type, make, or model. For example, the GUI can provide a different arrangement of user selectable icons for two-door cars, sedans, jeeps, trucks, SUVs, station wagons, mini-vans, etc. In some implementations, the customized display of user selectable icons is specific to the make and model of the user's vehicle. For example, various vehicles that are all classified as vans may have differing door arrangements. As another example, different types of pickup trucks can have two, three, or four doors for the cab. In some implementations, the GUI can also provide one or more text fields that allow the user to enter information on where items should be placed in the vehicle or additional instructions on where to place the items. For example, the user can specify that the items should be placed on the floor in the back seat rather than on the seat itself.

The server system 116 can also provide information on an estimated time of arrival and/or an estimated time until arrival for the user. For example, the mobile device 102 can calculate an estimated time until arrival for the user based on the estimated time for traversing the route 110 and provide this information to the server system 116 which can then provide the estimated time until arrival information to the computing device 118. As another example, the server system 116 can receive location information from the mobile device 102 and use this location information to calculate an estimated time until arrival for the user. For example, the user can give the dedicated application permission to access location information for the mobile device 102. A GPS unit or other location detection unit of the mobile device 102 can regularly determine the location for the mobile device 102. At the time of indicating to the server system 116 that the user has begun to travel along the route 110 to the store 106, the mobile device 102 can also indicate the current location of the mobile device 102. The server system 116 can then use either an internal time estimation routine, or communicate with an external routing system to identify an estimated time required for the user to travel from the current location of the mobile device 102 to the store 106 using any one of many known techniques. The server system 116 can then provide this estimated time until arrival information to the computing device 118, which can then provide this information to the employee. The provided estimated time until arrival can be periodically updated by the server system 116 as the user travels along the route 110 toward the store.

The computing device 118 includes a user interface 120. The user interface 120 can, for example, be a user interface for another dedicated application executing on the computing device 118 or another instance of the same dedicated application that is executing on the mobile device 102. The user interface 120 includes a user selectable control 122 that allows the employee to view all arriving orders (e.g., orders for which the user is on the way). The employee can select the control 122 by, for example, using a touch screen interface of the computing device 118 or one or more other input devices of or in communication with the computing device 118. The user interface 120 further includes a control 124 to allow the employee to view all placed orders. This could include all orders placed for fulfillment at the store 106 or all orders assigned specifically to the employee for fulfillment (for example, the server system 116 can assign specific orders to different employees for fulfillment). Selection of the all orders control 124 can cause the user interface 120 to display all orders that have been placed for fulfillment regardless of the user's status (e.g., orders for users that are on the way and orders for users that are not yet on the way).

In the example depicted in FIG. 1, the control 122 is selected and the user interface 120 is displaying a list 126 of orders for which the user is currently on the way and/or has already arrived. For example, an order listing 128 in the list 126 includes the user's name associated with the order, an estimated time until the indicated user is predicted to arrive at the store 106 (15 minutes) and an icon 130 indicating that the user associated with the order listing 128 has selected drive-up order fulfillment. Similarly, an order listing 132 indicates that a user named "Cindy L." is estimated to arrive at the store 106 in 23 minutes and includes an icon 134 indicating that Cindy L. has selected drive-up order fulfillment.

The user interface 120 further includes an order listing 136 indicating that a user named "Brent F." is estimated to arrive at the store 106 in 26 minutes and includes an icon 138 indicating that Brent F. has selected in-store pickup order fulfillment. In some implementations, in place of or in addition to the indication of an estimated time until arrival, each order listing can include a time indicator indicating the predicated time of arrival for the customer (e.g., 3:15 pm). In some implementations, the order listings in the list 126 can include less or more details with respect to each order. For example, each order listing can include vehicle identification information. As another example, each listing can include information on where the associated customer would like to have the bags/items for the order placed within the user's vehicle.

In some implementations, order listings in the list 126 are user selectable to allow the employee to view additional information about each order (as explained in greater detail below). For example, the employee can select the order listing 128 to cause the user interface 120 to display additional information about the order placed by Ted H. (which can be, for example, the user of mobile device 102). Additional details that can be displayed by the user interface 120 in response to selection of the order listing 128 can include an order number, a listing of items in the order, vehicle identification information, item place placement preference information for the customer indicating one or more locations within the customer's vehicle that the customer would like the items for the order to be placed, special instructions or requests entered by the customer, staging location information for bags containing the items for the order (e.g., one or more shelf or bin locations at a drive-up order fulfillment staging area), a number of bags for the order, an indication as to whether or not the order includes age restricted items (e.g., cold medicine, alcohol, etc.), and other information for the order.

Additional user interactions with the user interfaces of the mobile device 102 and the computing device 118 and communications between the mobile device 102 and computing device 118 will now be described with respect to FIGS. 2A-2N. FIG. 2A shows a user interface 202 of the mobile device 102 while FIG. 2B shows a corresponding user interface 204 of the computing device 118. The user interface 202 includes the map display 108 displaying the route 110 from the user's origin location 140 to the location 142 of the store 106. In this example, the user interface 202 further includes an icon 144 displayed on the map display 108 showing the user's progress along the route 110. As previously described, the mobile device 102 can provide location information to the server system 116 (e.g., in situations in which the user has granted the dedicated application permission to access location information for the mobile device 102). The server system 116 can use a series of received location information communications to identify that the user has begun to travel along the route 110 toward the store 106 and to estimate a time of arrival for the customer.

In response to determining that the user has begun to travel toward the store 106, the server system 116 provides a notification to the computing device 118 to prompt the computing device 118 to provide a notification to the employee that the user is on the way via the user interface 204. The notification from the server system 116 communicated to the computing device 118 can include additional information such as the ETA for the user, an identifier for the user (e.g., name, user id, customer number, etc.), an identifier for the order (e.g., an order number), information on the type of fulfillment for the order (e.g., drive-up fulfillment or in-store pickup fulfillment) and/or other information associated with the order. As discussed above, the server system 116 can communicate directly with the computing device 118 via the network 114 or, in some implementations, can communicate with a central computer located at the store 106 which in turn relays information to the computing device 118. For purposes of brevity, further communications will be described as being directly between the server system 116 and the computing device 118 but should be understood to also to cover communications of information that are relayed to the computing device 118 through one or more other computing devices from the server system 116.

In response to receiving the notification that the user has begun to travel toward the store 106, the computing device 118 causes the user interface 204 to display a notification to the employee. The computing device 118 can also provide audio (e.g., ringing, text to speech) or tactile (e.g., vibration) output to notify the employee that the user is on the way. In the example depicted in FIG. 2B, a notification 206 includes an indicator 208 that a guest is on the way (i.e., the user has begun to travel toward the store 106). The notification 206 further includes an order identifier 210 that includes an order number for the user's order and an indicator 212 of the estimated time until the user arrives at the store 106. The notification 206 further includes an icon 214 indicating that the user has selected drive-up order fulfillment for the order.

Figure 2D:
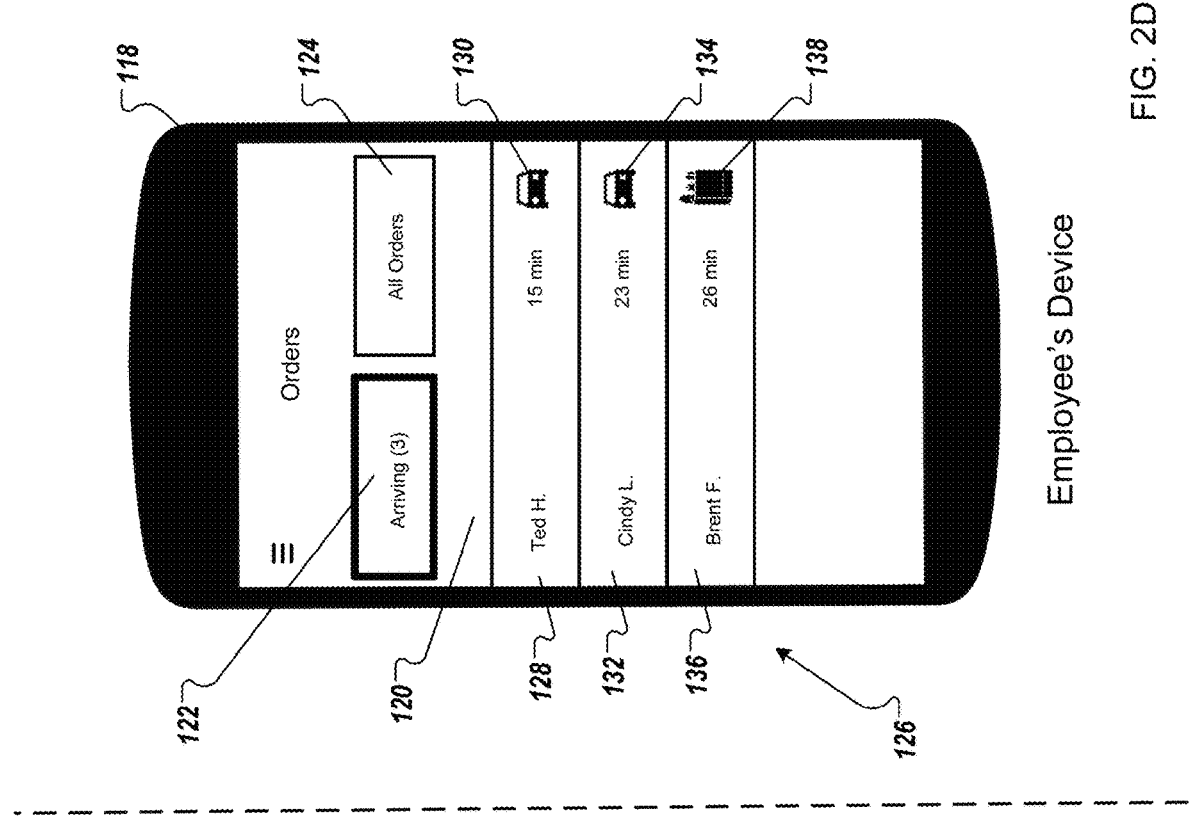
FIGS. 2A-2N show example user interface displays for computing devices in a drive-up order fulfillment system.
Figure 2C:
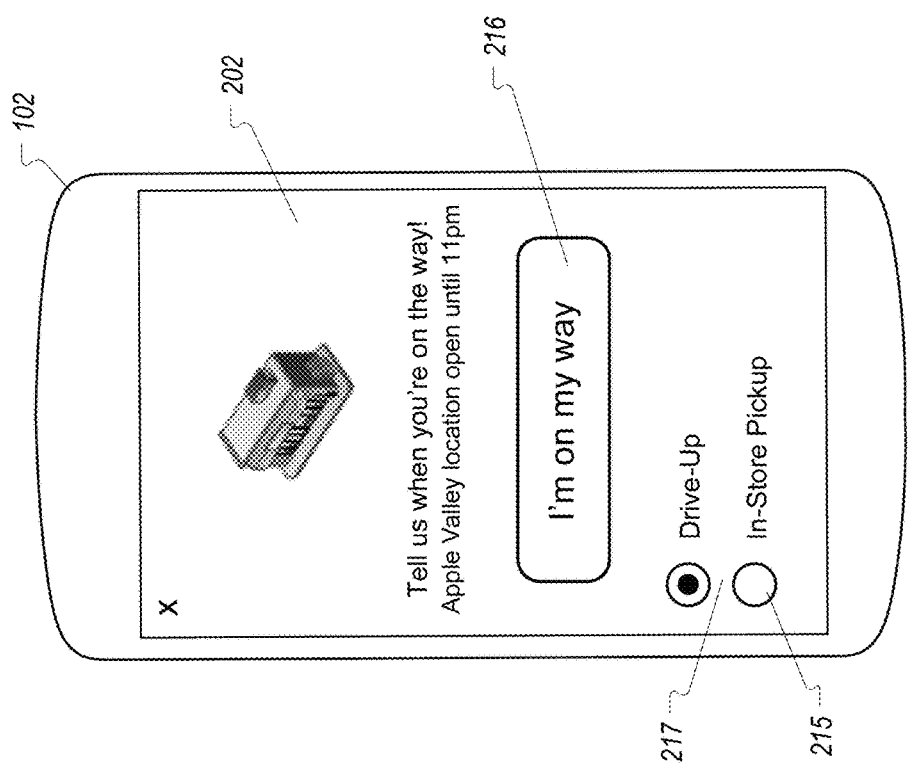

FIG. 2C shows an alternate version of the user interface 202. The version of user interface 202 shown in FIG. 2C can be employed, for example, when the user has not permitted the dedicated application to access location information for the mobile device 102 or in situations in which the mobile device 102 is unable to determine a location (e.g., tall buildings blocking GPS signals). The user interface 202 can include instructions to the user to indicate when they have begun to travel toward the store 106 and other relevant information, such as store hours for the store 106. The user interface 202 further includes a user selectable icon 216 that allows the user to indicate that they have begun to travel toward the store 106. Upon selection of the icon 216 by the user, the mobile device 102 communicates with the server system 116 to indicate that the user has begun to travel toward the store 106.

In some implementations, the user interface 202 includes a control 217 that allows the user to change the order fulfillment type. In the example shown in FIG. 2C, the control 217 indicates that the user has selected drive-up order fulfillment and further includes an option to change the order fulfillment type to in-store pickup. For example, the user may have indicated drive-up order fulfillment at the time of placing the order and now that the user has begun to travel toward the store 106, the control 217 now indicates that the user's order is designated for drive-up order fulfillment. The user can interact with the control 217 to change the order fulfillment type to in-store pickup, e.g., by selecting a selection area 215 next to an indication for "In-Store Pickup." In some implementations, when the customer interacts with the control 217 to change the order fulfillment type from in-store pickup to drive-up fulfillment, the dedicated application will provide a user interface that allows the customer to identify one or more locations within the vehicle that the customer would like items for the order to be placed. For example, such a user interface can be provided by the dedicated application in situations in which the customer has not pre-stored such item placement preference information.

As another example, selection of the control 217 by the user to change the fulfillment type from in-store pickup to drive-up fulfillment can trigger the dedicated application to display a user interface that prompts the user to enter vehicle identification information such as color, vehicle type, vehicle make, vehicle model, or a full or partial license plate number. For example, selection of the control 217 by the user to change the fulfillment type from in-store pickup to drive-up fulfillment can trigger the dedicated application to display a number of icons with different colors to allow the user to easily select a vehicle color. As another example, selection of the control 217 by the user to change the fulfillment type from in-store pickup to drive-up fulfillment can trigger the dedicated application to display a number of icons each displaying a different vehicle type (e.g., SUV, sedan, mini-van, motorcycle, bicycle), to allow the user to easily indicate her vehicle type. In some implementations, the user selectable icons for vehicle color and vehicle type are displayed simultaneously by the dedicated application. In some implementations, the dedicated application is triggered to display the above described user interfaces for prompting the user to enter vehicle information by user selection of the "I'm on my way" user selectable icon 216.

Additionally, in response to the user changing the order fulfillment type, the mobile device 102 will communicate with the server system 116 to indicate that the user has changed the order fulfillment type. The server system 116 can access a database storing information about the order and change the order fulfillment type for the order in response to receiving the communication. The server system 116 can also communicate with the computing device 118 to indicate to the computing device 118 that the order fulfillment type for the order has been changed. In some implementations, the control 217 can be included as a part of other user interface displays, such as the version of user interface 202 shown in FIG. 2A or as part of other user interface displays for mobile device 102 described with respect to later figures. In some implementations, the user can interact with another control, such as a menu control or action item control to access a user interface screen that includes the control 217.

FIG. 2D shows the computing device 118 displaying the user interface 120 of FIG. 1. In this example, the user selectable control 122 is selected to cause the user interface 120 to display the list 126 of orders for which the user is currently on the way and/or has already arrived. As previously described, the order listings 128, 132, and 136 provide identification information for users who are on the way to the store 106, information on ETA for each user, and icons indicating fulfillment type for each order. The user interface 120 can be displayed by the computing device 118, for example, in response to the employee selecting the notification 206 of FIG. 2B.

When a user changes the order fulfillment type, the mobile device 102 communicates with the server system 116 which in turn communicates with the computing device 118 to indicate to the computing device 118 that the order fulfillment type for the order has changed. The computing device 118 can then update the user interface 120 to reflect the change in order fulfillment type and notify the employee of the change. For example, in the example shown in FIG. 2D, if Cindy L. uses the control 217 to change her desired order fulfillment type from drive-up to in-store pickup, the icon 134 displayed for order listing 132 will change from a car (as shown in FIG. 2D) to a grocery bag, such as that displayed for icon 138. In some implementations, when the order fulfillment type for an order changes, the computing device 118 can cause the associated icon (e.g., the icon 134) to blink, change color (e.g., black to red), or otherwise change visually to alert the employee to the change in order fulfillment type. The computing device 118 can also provide a notification to the employee indicating that the order fulfillment type has changed in response to receiving a communication from the computing device 118 that the order fulfillment type has changed.

Figure 2F:
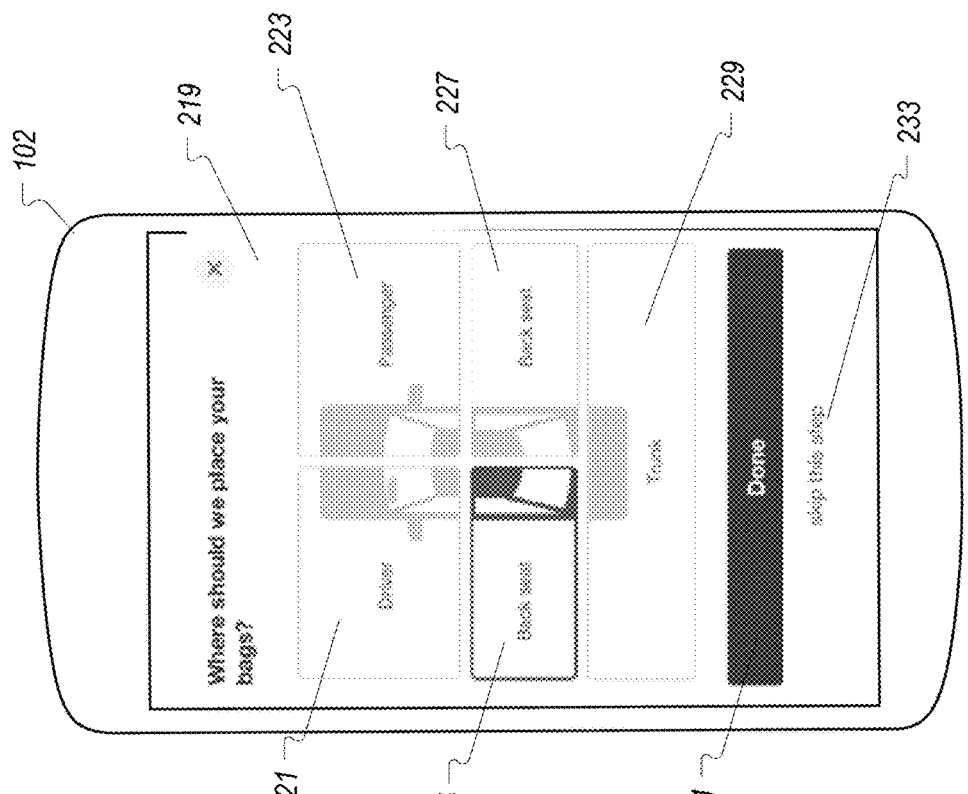
Figure 2E:
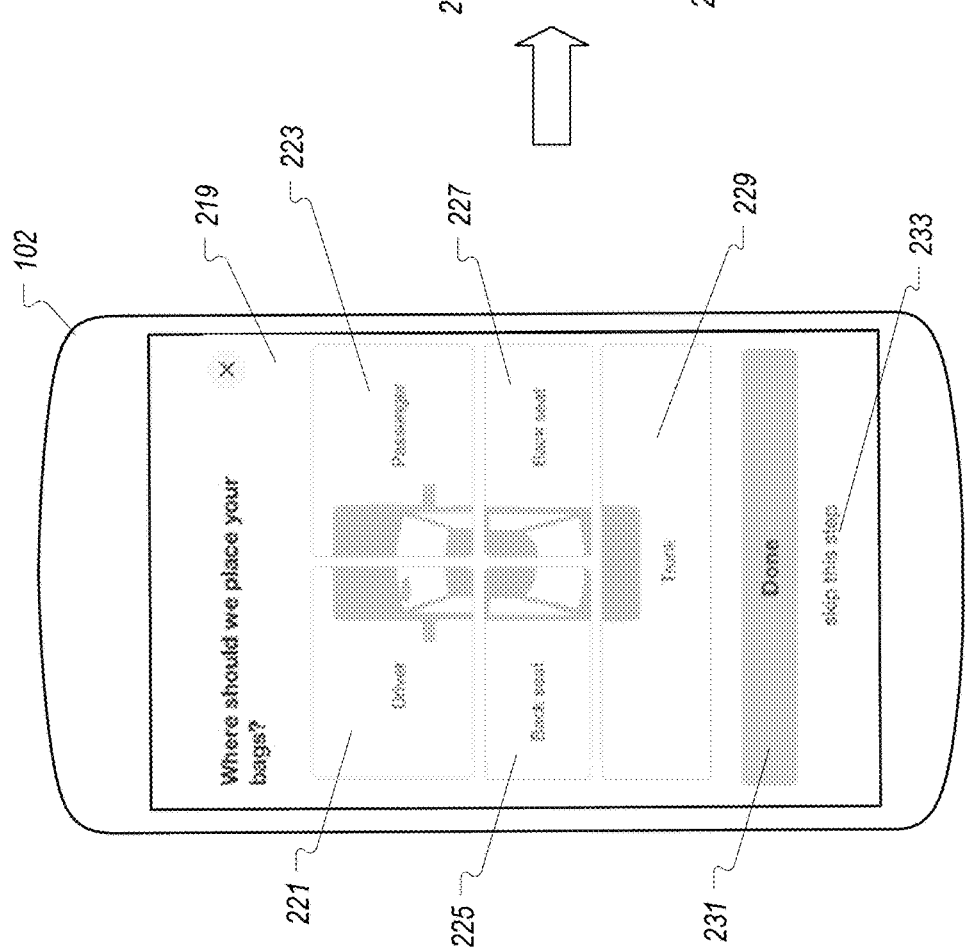

FIG. 2E shows a user interface 219 executing on the customer's mobile device 102. The user interface 219 allows the customer to indicate a preferred location for placement of bags and/or items for the customer's order within the customer's vehicle. By pre-specifying a location for placement of items for the customer's order within the customer's vehicle using the user interface 219, physical proximity of the customer and the employee bringing items for the customer's order to the customer's vehicle can be reduced or eliminated. The user interface 219 can be displayed by the mobile device 102 at one or more times along a ordering process. For example, the user interface 219 can be displayed as part of a profile creation process when the user first installs the dedicated application or as part of profile updating process (e.g., in response to selection of one or more controls to change settings). The item placement location preference information is then stored in association with the user's profile. In some implementations, such as situations in which the user has not pre-stored preferred item placement location information in association with the user's profile, the user interface 219 is displayed when the user is placing an order, when the user has indicated that they are heading to the fulfillment location, when it is determined (e.g., based on GPS signals received at the mobile device 102) that the user is heading to the fulfillment location, or at the time of arrival of the user at or near the fulfillment location. For example, the mobile device 102 can display the user interface 219 in response to the user indicating that they are parked in a designated drive-up fulfillment parking spot at or near the fulfillment location. As another example, the mobile device 102 can display the user interface 219 om response to the user selecting the "I'm on my way" control 216 of FIG. 2C. In some implementations, the mobile device 102 displays the user interface 219 in response to instructions received from the server system 116.

Continuing with FIG. 2E, the user interface 219 includes a plurality of user selectable icons that allow the user to indicate one or more locations that the user would like items for one or more orders placed in the user's vehicle. In the example shown, an image depicting an overhead view drawing of a vehicle is displayed across the user selectable controls, with a portion of the vehicle depicted on each control. In some implementations, the user may wish to select multiple locations, such as in the case of a large order having a large number of items (or larger items). In some implementations, the user interface 219 will automatically prompt the user to identify multiple locations for item placement in the user's vehicle based on one or more factors, such as the size of the user's order, the size of one or more items in the user's order, or information about the user's vehicle such as make and model or size.

In the example shown in FIG. 2E, the user interface 219 includes a user selectable control 221 that the user can select to indicate that items for the order should be delivered to the front driver's side seat. For example, the user may have ordered a coffee and a sandwich and would like the items handed to her in the driver's seat so that she can consume them while driving. In the example shown, the user selectable control 221 includes text indicating the driver's seat and shows a portion of an image of a vehicle on the user selectable control 221 to indicate the front driver's side of the car. In this example, the image depicting the front driver's side of the car includes an indication of a steering wheel. The user interface 219 further includes a user selectable control 223 that, when selected by the user, indicates that the user would like items for the order placed in the front passenger's side seat. The user selectable control 223 includes text indicating the passenger seat and shows a portion of the image of the vehicle on the user selectable control 223 to indicate the front passenger's side of the car.

The user interface 219 further includes a user selectable control 225 that, when selected by the user, indicates that the user would like items for the order placed in the rear, driver's side of the vehicle. The user selectable control 225 includes text indicating the back seat and shows a portion of the image of the vehicle on the user selectable control 225 to indicate the rear driver's side of the car. The user interface 219 further includes a user selectable control 227 that, when selected by the user, indicates that the user would like items for the order placed in the rear, passenger's side of the vehicle. The user selectable control 227 includes text indicating the back seat and shows a portion of the image of the vehicle on the user selectable control 227 to indicate the rear passenger's side of the car. The user interface 219 further includes a user selectable control 229 that, when selected by the user, indicates that the user would like items for the order placed in the trunk of the vehicle. The user selectable control 229 includes text indicating the trunk and shows a trunk portion of the image of the vehicle on the user selectable control 229.

The user interface 219 also includes a user selectable control 231 that the user can select to enter/save their selection for location of item placement within the vehicle. The user interface 219 also includes a user selectable control 233 that allows the user to skip this step and not select a preferred location for item placement in the user's vehicle. For example, the user may choose to skip this step at the time of creating a profile with the retailer and instead select the preferred item placement location at the time of placing an order or upon arrival at the fulfillment location. In some implementations, alternatively or in addition to allowing the user to identify a location within the vehicle for item placement the dedicated application can allow the user to enter text indicating the preferred location for placement of the items in the order within the vehicle. For example, the user interface 219 can include a text field in addition to the controls 221, 223, 225, 227, and 229 to provide additional or alternative instructions. For example, the user can type in "back seat on the floor on passenger side" or the user can type in "place items in trailer." In some implementations, the user interface 219 can include additional user selectable controls to further delineate where items should be placed. For example, the user interface 219 can include a control that allows the user to indicate if purchased items should be placed on the seat or on the floor.

FIG. 2F shows an updated version of the user interface 219 after the user has selected the control 225 to indicate that the user would like items for the order to be placed in the backseat on the driver's side. After selection of the control 225, the visual display of the control 225 is changed. For example, the color or shade of the selected control is changed, a fill pattern of part or all of the selected control is changed, part or all of the selected control is highlighted, the selected control is surrounded by a selection box, one or more icons are displayed on the selected control indicating selection of the control, or another aspect of the appearance of the control 225 is changed. For example, selection of the control 225 by the user can cause the user interface 219 to change the appearance of the user selectable control 225 from greyed out to green to indicate selection of the control 225 by the user. Such descriptions given with respect to the user selectable control 225 in the above examples apply equally to user selectable controls 221, 223, 227, and 229.

In the example, shown in FIG. 2F, selection of the user selectable control 225 by the user has also caused the display of the control 231 to change to indicate that the control 231 is now active. The user can now select the control 231 to save the selection of the driver's side back seat as the desired location for placement of items for the user's order.

In some implementations, in response to selection of the control 231, the mobile device 102 transmits a communication to the server system 116 indicating the preferred item placement location for the user's vehicle. In implementations in which the user interface 219 is displayed as part of a profile creation or editing process, the server system 116 stores the indicated preferred item placement location for the user's vehicle in association with the user's profile. In implementations in which the user interface 219 is displayed during the order placement process, at the time the user begins to travel to the fulfillment location, or at the time the user arrives at or near the fulfillment location, the server system 116 can provide the information on the preferred item placement location for the user's vehicle to the employee's computing device 118 in response to the communication received at the server system 116 indicating the preferred item placement location for the user's vehicle.

In some implementations, the communication indicating the preferred item placement location for the user's vehicle is transmitted from the mobile device 102 to the server system 116 in response to selection to one of the user selectable controls 221, 223, 225, 227, or 229 rather than or in addition to selection of the control 231.

In some implementations, the user interface 219 is customized based on information about the user's vehicle. For example, prior to displaying the user interface 219, the mobile device 102 may display one or more additional user interfaces to elicit input from the user regarding information about one or more vehicles owned or used by the user. For example, the one or more additional user interfaces can prompt the user to enter vehicle identification information such as color, vehicle type, vehicle make, vehicle model, or a full or partial license plate number. For example, the dedicated application can display a dropdown menu of automobile manufacturers to allow the user to select the manufacturer of the vehicle. Selection of the manufacturer can cause dedicated application to display a list of vehicle models made by the manufacturer to indicate the specific vehicle model for the user's vehicle. In some implementations, the dedicated application also allows the user to indicate a model year for the vehicle (e.g., by providing a dropdown menu).

As another example, the dedicated application can display a number of icons each displaying a different vehicle type (e.g., SUV, four-door sedan, two-door sedan, four-door convertible, two-door convertible, mini-van, conversion van, station wagon, hatchback, motorcycle, bicycle, etc.), to allow the user to easily indicate her vehicle type. In some implementations, user selectable icons for vehicle color and vehicle type are displayed simultaneously by the dedicated application. In some implementations, the dedicated application is triggered to display the above described user interfaces for prompting the user to enter vehicle information by user selection of the "I'm on my way" user selectable control 216 in FIG. 2C. The information on the user's vehicle can be elicited from the user during a profile creation or editing process and stored in association with the user's profile by the server system 116. In some implementations, information on the user's vehicle is elicited from the user at the time the user is placing the order or upon the user arriving at or near the fulfillment location.

In some implementations, the server system 116 stores vehicle information for multiple vehicles owned or operated by the user. In situations in which the user has stored information for multiple vehicles in association with the user's profile, the dedicated application can prompt the user to select from among the multiple pre-stored vehicles at the time of placing the order, at the time of beginning to travel to the fulfillment location, or at the time of arriving at or near the fulfillment location. For example, if the user has stored vehicle information for a white mini-van and a red pickup truck, the dedicated application can display icons representing each of the vehicles, nicknames entered by the user for each of the vehicles, make and model for each vehicle, and/or other identifying information for each vehicle. For example, such vehicle indicators can be displayed by the mobile device 102 as user selectable controls. The user can then select which vehicle that they are using for the present order.

In some implementations, upon the user entering information about the user's vehicle or selecting from among multiple pre-stored vehicles, the dedicated application will display a customized version of the user interface 219 based on some or all of the vehicle information. In some implementations, rather than displaying the customized version of the user interface 219 in response to user input, the dedicated application will display the customized version of the user interface 219 based on vehicle information retrieved by the server system 116. For example, in response to determining that the user has arrived at or near the fulfillment location, the server system 116 will retrieve information indicating a make and model for the user's vehicle or a vehicle type for the user's vehicle and send information to the mobile device 102 to cause the mobile device 102 to display a version of the user interface 219 that is customized based on the vehicle information. The pre-stored vehicle information may be vehicle information stored in association with a user profile for the user or vehicle information stored in association with the present order.

Using the vehicle information provided by the user, the server system 116 and/or mobile device 102 can generate a customized version of the user interface 219 that is specific to the indicated vehicle model or vehicle type. For example, if the indicated vehicle type is a two-door pickup truck, the dedicated application can display a version of the user interface 219 that includes user selectable controls for the driver's side door, the passenger's side door, or the truck bed. Each icon can include a portion of an overhead image of a two-door truck to indicate the respective portions of the truck. As another example, if the indicated vehicle model is a four-door truck, the dedicated application can display a version of the user interface 219 that includes user selectable controls for front and rear driver's side doors, front and rear passenger's side doors, and the truck bed. Each icon can include a portion of an overhead image of a four-door truck to indicate the respective portions of the truck. As yet another example, if the indicated model is a mini-van having a sliding door on one side, the dedicated application can display a customized version of the user interface 219 that includes a user selectable icon for the driver's seat, a user selectable icon for the passenger's seat, a user selectable icon for the sliding door along the passenger's side, and a user selectable icon for the trunk or hatchback of the mini-van. Each icon can include a portion of an overhead image of a mini-van having the indicated configuration to indicate the respective portions of the mini-van.

In some cases, the user interface 219 is customized for different vehicles having the same or similar door layouts by changing the overhead image of the vehicle to more closely resemble the indicated vehicle model or type. For example, an SUV and a four-door sedan may have similar door configurations but the dedicated application will provide different customized versions of the user interface 219 for the different vehicle types having different overhead images based on the indicated vehicle type.

FIG. 2G shows a user interface 218 for the mobile device 102. In this example, the user interface 218 is a lock screen for the mobile device 102. The user interface 218 can be displayed, for example, in situations in which the user has granted permission for the dedicated application to continually access location information for the mobile device 102 (e.g., "always on"). The user interface 218 includes a notification 220 that is displayed in response to a determination that the mobile device 102 as arrived at the store 106. For example, the mobile device 102 can be identified as having arrived at the store 106 upon the location of the mobile device 102 indicating that the mobile device 102 is located within the parking lot of the store 106. As another example, the mobile device 102 can be identified as having arrived at the store 106 upon the location of the mobile device 102 indicating that the mobile device 102 is located within a specified distance of the store 106 (e.g., 300 meters). In some implementations, the user interface 218 is displayed in response to the user selecting a control to indicate that they have arrived at the fulfillment location.

The determination that the mobile device 102 has reached the store 106 can be made by the mobile device 102 or by the server system 116. For example, as the user progresses along the route 110, the mobile device 102 can continue to provide location information for the mobile device 102 to the server system 116. Upon the server system 116 receiving location information indicating that the mobile device 102 has arrived at the store 106 (e.g., is located in the parking lot of the store 106), the server sends a notification to the mobile device 102 which causes the dedicated application to provide the notification 220 to the user. As another example, the dedicated application can perform the determination by comparing location information for the mobile device 102 to information indicating the location of the store 106 and/or location information for the parking lot of the store 106 to determine when the user has arrived at the store 106. Upon determining that the user has arrived at the store 106, the dedicated application causes the mobile device 102 to display the notification 220. The dedicated application can further cause the mobile device 102 to transmit a communication to the server system 116 indicating that the user has arrived at the store 106.

The notification 220 includes an indication 222 of the dedicated application (e.g., text and/or an icon) to help the user to readily distinguish that the notification 220 is related to drive-up order fulfillment from notifications related to other applications installed on the mobile device 102. The notification 220 further includes a greeting 224 and instructions 226 for next steps for the user. In the example shown in FIG. 2G, the instructions 226 prompt the user to enter a parking stall number. For example, the fulfillment location may include dedicated parking spots for drive-up orders with each drive-up order parking spot having a dedicated parking spot number displayed on a sign or painted on the concrete. The user can unlock the mobile device 102, open the dedicated application, and/or select the notification 220 to cause the mobile device 102 to display a text box in which the user can enter the number or other identifier for the parking spot at which they are parked. As another example, rather than a text box, the mobile device 102 can display a plurality of user selectable icons for the user to indicate the parking spot at which they are located.

FIG. 2H shows an example user interface 228 of the computing device 118 containing a notification 230 that is displayed in response to the user arriving at the store 106. For example, upon the server system 116 determining that the user has arrived at the store 106 or receiving a communication from the mobile device 102 indicating that the user has arrived at the store 106, the server system 116 sends a communication to the computing device 118 to cause the computing device 118 to display the notification 230. For example, the customer can select an "I'm here" control on the mobile device 102 such as a control 238 as shown in FIG. 2I to indicate that they have arrived at the store or fulfillment location. This can cause the mobile device 102 to transmit a communication to the server system 116 which then communicates with the computing device 118 to cause the computing device 118 to display the notification 230.

The computing device 118 can also provide audio (e.g., ringing, text to speech) or tactile (e.g., vibration) output to notify the employee that the user has arrived. In the example depicted in FIG. 2H, the user interface 228 is displaying a lock screen for the computing device 118. The computing device 118 can provide the notification 230 on the lock screen that indicates that the user has recently arrived at the store 106. The notification 230 includes an indicator 232 that a guest has arrived (i.e., the user has arrived in the parking lot). The notification 230 further includes an order identifier 234 that includes an order number for the user's order.

The notification 230 further includes the icon 214 indicating that the user has selected drive-up order fulfillment for the order. The notification 230 further includes a display 241 indicating the location within the user's vehicle that the user has indicated that items for the order should be placed. As previously discussed, this user-preferred item placement location information can be derived from user input provided by the user as part of a user profile or provided at the time the user places the order or at the time that the user arrives at or near the fulfillment location. In the example shown in FIG. 2H, the display 241 shows an image of an overhead view of a vehicle with a sector of the vehicle highlighted to indicate that the user prefers that items be placed in the indicated portion of the vehicle. In this example, the display 241 indicates that items should be placed in the rear, driver's side seat. In some implementations, in addition to or in place of the visual indication of where in the user's vehicle the items for the order should be placed, the notification 230 can include text indicating where in the user's vehicle items for the order should be placed. In some instances in which the user has not indicated a location preference for placement of item's within the user's vehicle, the display 241 is not included in the notification 230.

In some implementations, the display 241 can be customized based on user provided information about the model or vehicle type of the user's vehicle. For example, the door configuration shown in the display 241 can be customized based on the vehicle model or type. As another example, the image of the overhead view of the vehicle can be customized based on the vehicle model or type. Such customization of the display 241 can be performed, for example, by the server system 116 which can provide information to the computing device 118 to allow the computing device 118 to display the customized version of the display 241 as part of the notification 230. In some implementations, the display 241 is not included in the initial notification 230 pushed to the computing device 118 but rather is displayed as part of a subsequent user interface. For example, in some implementations, the user interface 228 allows the employee to select the notification 230 which causes the computing device 118 (if in an unlocked state) to display a subsequent user interface that includes the display 241 or a version of the display 241 (as described above). As described in greater detail below, in some implementations the computing device 118 presents a user interface that includes the display 241 in response to selection of one of the order listings 128, 132, 136 of the list 126 of orders discussed with respect to FIG. 2D.

In some implementations, the notification 230 can include more or less information. For example, the notification can include the user's name, vehicle identification information, parking space number/identifier at which the user is parked, an indication of a staging location for the order (e.g., one or more bins in a staging area), an indication that perishable goods for the order need to be collected, or other information related to the order.

FIG. 2I shows an alternate arrival user interface 236 for the mobile device 102. The user interface 236 can include instructions to the user on where to park for drive-up fulfillment and can also provide instructions to prompt the user to enter a parking space number or other identifier for the parking space at which they have parked and also indicate when they have arrived. The user interface 236 includes a text field 243 that allows the user to enter a parking space number or other parking space identifier to indicate a parking space at which they have parked at the fulfillment location. The user interface 236 includes a user selectable icon 238 that allows the user to indicate that they have arrived at the store 106 and submit the parking space number or identifier entered into the text field 243. Upon selection of the icon 238 by the user, the mobile device 102 communicates with the server system 116 to indicate that the user has arrived at the store 106 and provide the parking space number or identifier entered by the user. In some implementations, the user interface 236 includes a user selectable control 240 that allows the user to view details on the order.

FIG. 2J shows the computing device 118 displaying an updated version of the user interface 120 of FIG. 1 and FIG. 2D. In this example, the user selectable control 122 is selected to cause the user interface 120 to display the list 126 orders for which the user is currently on the way and/or has already arrived. The list 126 has been updated such that the order listing 128 is no longer present, indicating that fulfillment of the order associated with the order listing 128 has been completed (e.g., the associated user has received their order). The order listings 132 and 136 have been updated to indicate updated statuses for the users associated with those respective orders. For example, the order listing 136 indicates that Brent F. is now 2 minutes away. Furthermore, the user interface 120 has updated to indicate that Cindy L. has now arrived at the store. For example, an indicator 242 indicates that Cindy L. has arrived at the fulfillment location. The listing 132 can be updated by the server system 116 based on receiving one or more communications from the mobile device 102 indicating that the user has arrived (e.g., via user selection of the selectable icon 238, or via automatic detection of the mobile device 102 within a specified proximity of the fulfillment location). In some implementations, the indicator 242 is implemented as a count-up timer indicating the amount of time since Cindy arrived at the store 106.

In some implementations, the user interface 120 as shown in FIG. 2J can be displayed by the computing device 118, for example, in response to the employee selecting the notification 230 of FIG. 2H and then unlocking the computing device 118, such as by entering a security code or scanning a fingerprint. As another example, the employee may already have unlocked the computing device 118 and may be viewing the application executing on the computing device 118. In response to the computing device 118 receiving the notification from the server system 116 that the user has arrived at the store 106, the computing device 118 updates the user interface 120 to indicate that Cindy L. has arrived at the fulfillment location.

For example, the user of the mobile device 102 may be Cindy L. Upon the server system 116 determining that Cindy has arrived at the store 106 (e.g., based on location data of the mobile device 102 or based on receiving a communication from the mobile device 102 indicating arrival at the store 106), the server system 116 provides a notification to the computing device 118 indicating that Cindy has arrived. This can cause the computing device 118 to update the user interface 120 to indicate that Cindy L. has arrived. Additionally, the user interface 120 can be updated to indicate an updated ETA for Brent F.

FIG. 2K shows an example user interface 244 that can be displayed in response to a determination that the user has arrived at the store 106. For example, upon the dedicated application determining that the user has arrived at the store, the dedicated application displays the user interface 244. As another example, the server system 116 can determine that the user has arrived at the store 106 and send a communication to the mobile device 102 to cause the mobile device 102 to display the user interface 244. The user interface 244 can include a greeting and information such as an indication that an employee of the store will arrive with the user's order soon. In some implementations, the user interface 244 can include a timer (not shown) that indicates an amount of time since the user has arrived at the store 106. In some implementations, the user interface 244 includes a user selectable icon 246 that, when selected, causes the dedicated application to display a verification code that can be used to verify that the order being provided to the user is the correct order. The verification code can be a human readable code and/or a computer readable code. For example, the employee can view a displayed alphanumeric verification code and compare the displayed verification code to an alphanumeric code displayed on the computing device 118 or printed on a print out affixed to one or more of the bags for the order to verify that the order is being provided to the correct customer. As another example, the verification code can be a barcode, QR code, or other computer readable code that is scanned by the employee using the computing device 118 to verify the order.

FIG. 2L shows an example user interface 248 that can be displayed by the computing device 118 in response to selection of the order listing 132 (FIG. 2J) displayed on the computing device 118 by the employee. For example, the employee can select the order listing 132 (or another order listing) to view details on the associated order and/or other orders associated with the user. For example, upon the employee selecting the order listing 132 displayed as part of the user interface 120, the computing device 118 displays the user interface 248 containing details on one or more active orders placed by Cindy L.

The user interface 248 includes a header 250 containing a customer identifier, such as the customer's name. The header 250 includes user selectable controls 251 and 253 that can be used to perform additional actions or view additional information. For example, selection of the control 251 can cause the computing device 118 to display information about the customer indicated in the header 250. As another example, selection of the control 253 can allow the employee to take actions with respect to one or more selected orders associated with the customer, such as cancel an order, indicate an unavailable item, delay an order, or other actions. As another example, selection of the control 251 or the control 253 can cause the user interface 248 to display a list of items included in one or more selected active orders associated with the customer.

A field 252 of the user interface 248 indicates that the customer indicated in the header 250 has arrived and includes a timer 254 indicating the amount of time that has elapsed since the customer has arrived. In some implementations, prior to arrival of the customer, the field 252 will include an indicator of "order placed" or "on the way" to indicate the customer's status. For example, the field 252 can indicate that the customer is on the way and the timer 254 can indicate an ETA for the customer. The field 252 further includes an indication of the parking spot at which the customer has parked. For example, the server system 116 receives a communication from the mobile device 102 indicating the parking spot entered into the text field 243 (FIG. 2I) and the server system 116 then provides the parking spot number to the computing device 118 for display to the employee in field 252.

The user interface 248 includes a field 260 indicating an order for the customer, along with an order number for the order. The field 260 can include a checkbox 262 that can be selected when the employee wants to take an action with respect to the order indicated by the field 260. For example, the employee can select the checkbox 262 and then select the control 254 to take one or more actions with respect to the selected order, such as indicating that the employee has taken ownership of completing the order and delivering it to the customer's vehicle.

Sub-field 264 nested under the field 260 indicates where the purchased items for the order are located. For example, the field 264 includes an indication of "FOS-A002," which can indicate that part of the order is located at the Front of Store staging area in bin A002. The field 264 includes an indicator 268 indicating the number of bags at the indicated location. In the example depicted, the field 264 indicates that there are four bags for the order located at bin FOS-A002. The information in the field 264 can ensure that the employee gathers the correct number of bags for fully completing the customer's order.

The user interface 248 further includes the display 241 which indicates one or more locations within the customer's vehicle that the customer would like items for the order to be placed, as previously discussed with respect to FIG. 2H. In the example shown in FIG. 2L, the display 241 shows an image of an overhead view of a vehicle with a sector of the vehicle highlighted to indicate that the user prefers that items be placed in the indicated portion of the vehicle. In this example, the display 241 indicates that items should be placed in the rear, driver's side seat. In some implementations, in addition to or in place of the visual indication of where in the user's vehicle the items for the order should be placed, the user interface 248 can include text indicating where in the user's vehicle items for the order should be placed. In some instances in which the user has not indicated a location preference for placement of item's within the user's vehicle, the display 241 is not included in the user interface 248.

In some implementations, the display 241 can be customized based on user provided information about the model or vehicle type of the user's vehicle. For example, the door configuration shown in the display 241 can be customized based on the vehicle model or type. As another example, the image of the overhead view of the vehicle can be customized based on the vehicle model or type. Such customization of the display 241 can be performed, for example, by the server system 116 which can provide information to the computing device 118 to allow the computing device 118 to display the customized version of the display 241 as part of the notification 230.

FIG. 2M shows an example user interface 266 for the user's mobile device 102 that includes information for the user to show to the employee to verify that the user is receiving the correct order. For example, the user can show the mobile device 102 displaying the user interface 266 to the employee through the driver's side window of the user's vehicle such that the driver's side window acts as a physical barrier between the employee and the user to reduce or prevent the spread of airborne viruses. The user interface 266 having can be displayed, for example, in response to selection by the user of the user selectable icon 246 of FIG. 2K, selection of the user selectable control 231 of FIG. 2E, or selection of the user selectable icon 238 of FIG. 2I. In some implementations, the user interface 266 is automatically displayed in response to a determination that the user has arrived at the store 106. The information shown as being included in the user interface 266 in the example of FIG. 2M can be displayed as part of a notification on a lock screen of the mobile device 102.

In the example depicted in FIG. 2M, the user interface 266 includes information that can be quickly viewed by the employee delivering the order to the user's vehicle to verify that the employee is providing the items to the correct vehicle. In this example, the user interface 266 displays a name 270 of the user (in the case, just the last name, although both first and last name, only first name, or first name and last initial could be displayed). The employee can view the name displayed on the user interface 266 to verify that this is the correct name for the customer associated with the order being delivered to the vehicle. The user interface 266 further displays a verification code 272 and instructions 274 on where to place the items for the order in the user's vehicle. The instructions 274 are, for example, based on user input received in response to user interaction with the user interface 219 as described with respect to FIGS. 2E-2F. The instructions 274 can be helpful to remind the employee where the items should be placed in the user's vehicle. For example, the employee may be delivering orders to multiple vehicles at once. The instructions 274 can instruct the employee where the user would like items placed without the employee having to double check the order information on the computing device 118. The user interface 266 further includes instructions 276 to the user instructing the user to show the user interface 266 shown on the screen of the mobile device 102 to the employee through the vehicle window to allow the employee to verify the order.

The verification code 272 can be a unique numeric or alphanumeric code that is associated with the user. In other implementations, the verification code 272 can be a unique code that is associated with the user's order or associated with all active orders for the user. In such implementations, the verification code 272 can change between each order for the same user. In some implementations, another verification method can be used, such as a matrix barcode, a unique barcode, or other unique indicator.

FIG. 2N shows an example user interface 280 for the computing device 118 for facilitating delivery of the customer's items to the correct vehicle and verification that the employee is delivering the correct order to the correct vehicle. For example, the user interface 280 includes information 281 that indicates to the employee a vehicle type for the customer's vehicle ("Cadillac"), a location of the customer's vehicle ("Parking Spot #8") and a textual indication of where in the vehicle the items for the order should be placed ("Place bags in Trunk"). In some implementations, the user interface 280 can include a visual depiction of where in the user's vehicle the items for the order should be placed. For example, the user interface 280 can include a display similar to the display 241 indicating the location within the user's vehicle that the user has indicated that items for the order should be placed shown in FIG. 2H.

Additionally, the user interface 280 can prompt the employee to enter the verification code 272 displayed on the mobile device 102 into a text field 282 and select a user selectable control 284 to submit the verification code 272 to confirm the order. Selection of the user selectable control 284 can cause the computing device 118 to transmit the verification code entered into the text field 282 to the server system 116.

The server system 116 can then check to see that the entered verification code matches the order for customer "Lauper." For example, the server system 116 (or the computing device 118) can compare identifying information (e.g., for the user or the order) associated with the entered verification code to identifying information for the user or the order to verify that the employee is providing the correct order to the user. In some implementations, such a determination is made at a central computer of the store 106 in communication with the computing device 118 or at the server system 116. If the entered verification code matches the verification code 272 displayed by the mobile device 102 and matches the order being delivered, the server system 116 can send a confirmation to the computing device 118 which can cause the computing device 118 to display an updated user interface confirming that the employee is delivering the order to the correct vehicle.

In some implementations, in addition to or in place of the text field 282, the user interface 280 displays the verification code for the order so that the employee can visually inspect the verification code 272 displayed by the mobile device 102 and the verification code displayed by the user interface 280 to ensure that they match. The user interface 280 can also include an indication of where the items for the order should be placed in the user's vehicle, such as text indicating "place in trunk" or the display 241, as previously discussed.

Figure 3:
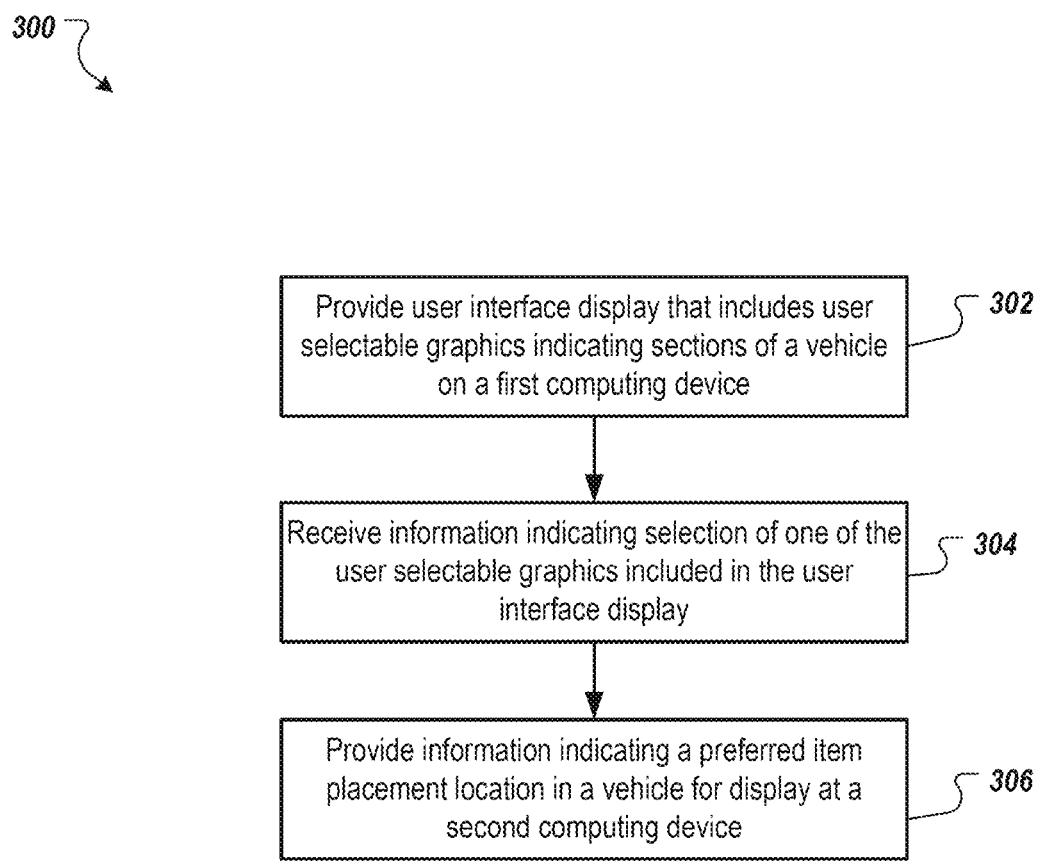
FIG. 3 is a flowchart of an example process to be performed by one or more computing devices in a drive-up order fulfillment system.

FIG. 3 is a flowchart of an example process 300 to be performed by a computing device in a drive-up order fulfillment system. For example, the process 300 can be performed by the computing device 118 of an employee of a store. The process 300 includes providing a user interface display that includes a user selectable graphics indicating sections of a vehicle on a first computing device (302). For example, the computing device can, based on instructions received from a server system, display a user interface such as the user interface 219 of FIGS. 2E-2F having multiple user selectable controls, with each control depicting a visual image of a portion of a vehicle to allow a user to quickly and intuitively identify one or more locations within a vehicle to place items for a drive-up fulfillment order.

Next, the process 300 receives information indicating selection of one or the user selectable graphics included in the user interface display (304). For example, the user of the first computing device may have selected one of the user selectable controls to indicate that items for the order should be placed in the trunk of the user's vehicle. The first computing device can transmit information indicating this selection to a server system.

The process 300 further includes providing information indicating the preferred item placement location for the user's vehicle for display at a second computing device (306). For example, upon receiving the information from the first computing device indicating the preferred location to place items in the user's vehicle, the server system transmits a communication to a mobile computing device of an employee of the fulfillment location indicating that the user wishes to have items for the order placed in the trunk of the user's vehicle.

Figure 4:
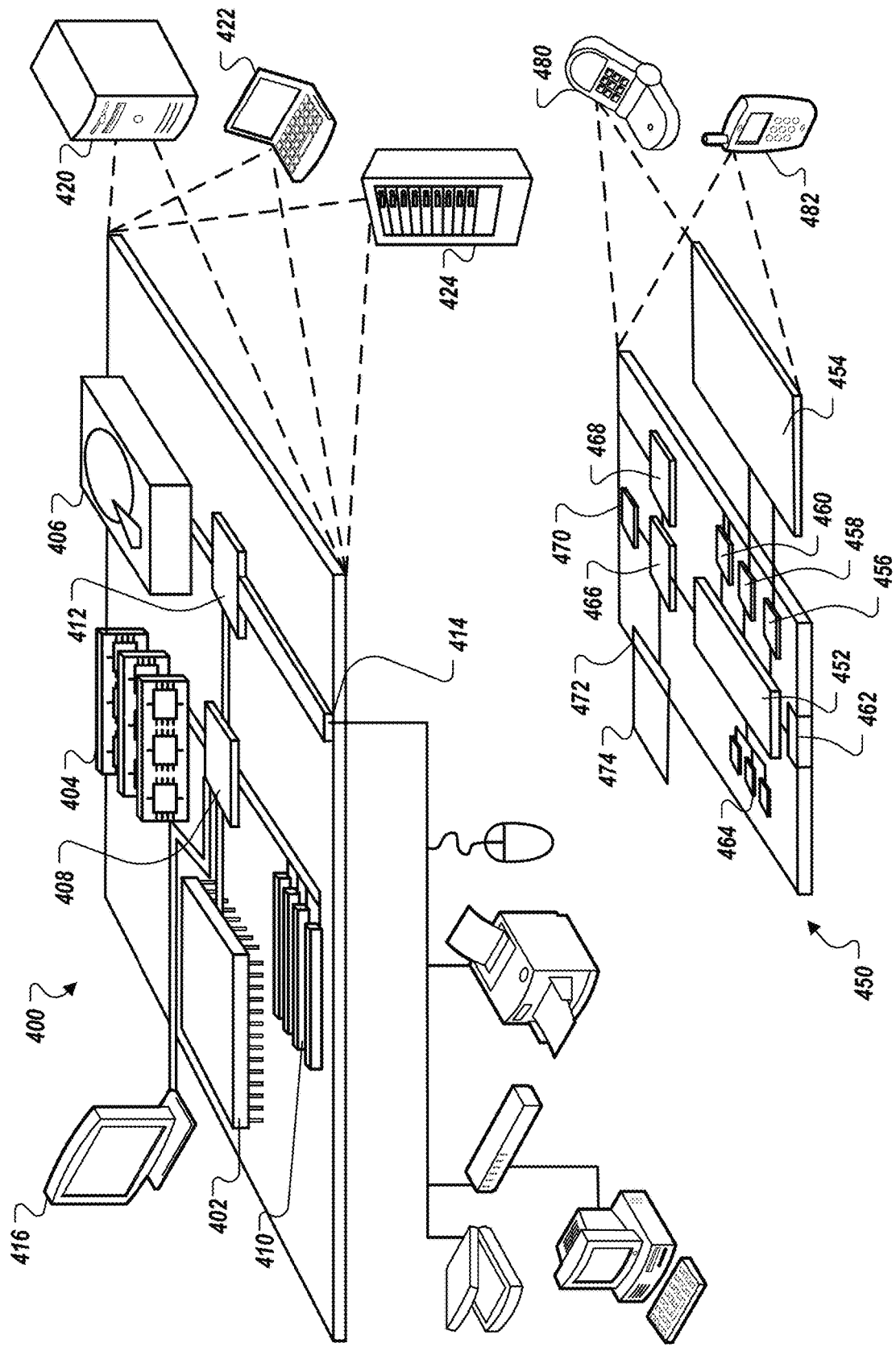
FIG. 4 is a schematic diagram that shows an example of a computing system.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor and can be implemented in a high-level procedural and/or object-oriented programming language and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer implemented method comprising:
    receiving, by a first computing device, user input initiating an online ordering process;
    receiving, by the first computing device, user input indicating selection of one or more items for inclusion in an online order;
    receiving, by the first computing device, user input indicating submission of the online order;
    in response to receiving the user input indicating submission of the online order, providing, by the first computing device, a first user interface, the first user interface including a plurality of user selectable controls, each of the plurality of user selectable controls representing a different portion of a vehicle, the providing comprising:
        accessing information on a vehicle type of the vehicle, a make of the vehicle, a model of the vehicle, or a combination thereof; and
        customizing at least one of the plurality of user selectable controls based on the accessed information by providing a particular door arrangement for the vehicle with at least a first user selectable control corresponding to a first door of the particular door arrangement for the vehicle and a second user selectable control corresponding to a second door of the particular door arrangement for the vehicle;
    receiving, by the first computing device, an indication of user selection of one of the plurality of user selectable controls;
    in response to receiving the indication of user selection of the one of the plurality of user selectable controls, transmitting, to a computing system, information indicating a location within the vehicle for placement of the one or more items in the online order;
    detecting, by the computing system, that the first computing device is located at a fulfillment location;
    in response to detecting that the first computing device is located at the fulfillment location, displaying, on a lock screen of the first computing device, a notification prompting a user of the first computing device to input a location identifier; and
    in response to receiving the location identifier from the first computing device, providing, by the computing system to a second user device associated with an employee at the fulfillment location, a second user interface including the information indicating the location within the vehicle for placement of the one or more items in the online order.

2. The method of claim 1, wherein the plurality of user selectable controls comprises:
    the first user selectable control further corresponding to a passenger side of the vehicle;
    the second user selectable control further corresponding to a driver's side of the vehicle; and
    a third user selectable control corresponding to a trunk of the vehicle.

3. The method of claim 1, wherein the plurality of user selectable controls comprises:
    the first user selectable control further corresponding to a front driver's side door of the vehicle;
    the second user selectable control further corresponding to a front passenger side door of the vehicle;
    a third user selectable control corresponding to a rear driver's side portion of the vehicle;
    a fourth user selectable control corresponding to a rear passenger's side of the vehicle; and a fifth user selectable control corresponding to a trunk of the vehicle.

4. The method of claim 3, wherein:
the first user selectable control includes a graphic depiction of the front driver's side door of the vehicle;
the second user selectable control includes a graphic depiction of the front passenger side door of the vehicle;
the third user selectable control includes a graphic depiction of the rear driver's side portion of the vehicle;
the fourth user selectable control includes a graphic depiction of the rear passenger's side of the vehicle; and
the fifth user selectable control includes a graphic depiction of the trunk of the vehicle.

5. The method of claim 1, wherein each of the plurality of user selectable controls includes a graphic depiction of the corresponding different portion of the vehicle for that user selectable control.

6. The method of claim 1, further comprising:
in response to receiving the indication of user selection of the one of the plurality of user selectable controls, changing an appearance of the one of the plurality of user selectable controls on the first user interface.

7. The method of claim 6 wherein changing the appearance of the one of the plurality of user selectable controls on the first user interface comprises changing a color of the one of the plurality of user selectable controls.

8. A system comprising:
one or more processors;
computer memory containing instructions that, when executed by the one or more processors, cause the system to perform operations comprising:
receiving, by a first computing device, user input initiating an online ordering process;
receiving, by the first computing device, user input indicating selection of one or more items for inclusion in an online order;
receiving, by the first computing device, user input indicating submission of the online order;
in response to receiving the user input indicating submission of the online order, providing, by the first computing device, a first user interface, the first user interface including a plurality of user selectable controls, each of the plurality of user selectable controls representing a different portion of a vehicle, the providing comprising:
accessing information on a vehicle type of the vehicle, a make of the vehicle, a model of the vehicle, or a combination thereof; and
customizing at least one of the plurality of user selectable controls based on the accessed information by providing a particular door arrangement for the vehicle with at least a first user selectable control corresponding to a first door of the particular door arrangement for the vehicle and a second user selectable control corresponding to a second door of the particular door arrangement for the vehicle;
receiving, by the first computing device, an indication of user selection of one of the plurality of user selectable controls;
in response to receiving the indication of user selection of the one of the plurality of user selectable controls, transmitting, to a computing system, information indicating a location within the vehicle for placement of the one or more items in the online order;
detecting, by the computing system, that the first computing device is located at a fulfillment location;
in response to detecting that the first computing device is located at the fulfillment location, displaying, on a lock screen of the first computing device, a notification prompting a user of the first computing device to input a location identifier; and
in response to receiving the location identifier from the first computing device, providing, by the computing system to a second user device associated with an employee at the fulfillment location, a second user interface including the information indicating the location within the vehicle for placement of one or more items in the online order.

9. The system of claim 8, wherein the plurality of user selectable controls comprises:
the first user selectable control further corresponding to a passenger side of the vehicle;
the second user selectable control further corresponding to a driver's side of the vehicle; and
a third user selectable control corresponding to a trunk of the vehicle.

10. The system of claim 8, wherein the plurality of user selectable controls comprises:
the first user selectable control further corresponding to a front driver's side door of the vehicle;
the second user selectable control further corresponding to a front passenger side door of the vehicle;
a third user selectable control corresponding to a rear driver's side portion of the vehicle;
a fourth user selectable control corresponding to a rear passenger's side of the vehicle; and
a fifth user selectable control corresponding to a trunk of the vehicle.

11. The system of claim 10 wherein:
the first user selectable control includes a graphic depiction of the front driver's side door of the vehicle;
the second user selectable control includes a graphic depiction of the front passenger side door of the vehicle;
the third user selectable control includes a graphic depiction of the rear driver's side portion of the vehicle;
the fourth user selectable control includes a graphic depiction of the rear passenger's side of the vehicle; and
the fifth user selectable control includes a graphic depiction of the trunk of the vehicle.

12. The system of claim 8, wherein each of the plurality of user selectable controls includes a graphic depiction of the corresponding different portion of the vehicle for that user selectable control.

13. The system of claim 8, the operations further comprising:
in response to receiving the indication of user selection of the one of the plurality of user selectable controls, changing an appearance of the one of the plurality of user selectable controls on the first user interface.

14. The system of claim 13 wherein changing the appearance of the one of the plurality of user selectable controls on the first user interface comprises changing a color of the one of the plurality of user selectable controls.

15. A non-transitory computer-readable medium containing instructions that, when executed by one or more processors, cause the performance of operations comprising:
receiving, by a first computing device, user input initiating an online ordering process;

receiving, by the first computing device, user input indicating selection of one or more items for inclusion in an online order;

receiving, by the first computing device, user input indicating submission of the online order;

in response to receiving the user input indicating submission of the online order, providing, by the first computing device, a first user interface, the first user interface including a plurality of user selectable controls, each of the plurality of user selectable controls representing a different portion of a vehicle, the providing comprising:

accessing information on a vehicle type of the vehicle, a make of the vehicle, a model of the vehicle, or a combination thereof; and customizing at least one of the plurality of user selectable controls based on the accessed information by providing a particular door arrangement for the vehicle with at least a first user selectable control corresponding to a first door of the particular door arrangement for the vehicle and a second user selectable control corresponding to a second door of the particular door arrangement for the vehicle;

receiving, by the first computing device, an indication of user selection of one of the plurality of user selectable controls;

in response to receiving the indication of user selection of the one of the plurality of user selectable controls, transmitting, to a computing system, information indicating a location within the vehicle for placement of the one or more items in the online order;

detecting, by the computing system, that the first computing device is located at a fulfillment location;

in response to detecting that the first computing device is located at the fulfillment location, displaying, on a lock screen of the first computing device, a notification prompting a user of the first computing device to input a location identifier; and in response to receiving the location identifier from the first computing device, providing, by the computing system to a second user device associated with an employee at the fulfillment location, a second user interface including the information indicating the location within the vehicle for placement of the one or more items in the online order.

16. The non-transitory computer-readable medium of claim 15, wherein the plurality of user selectable controls comprises:

the first user selectable control further corresponding to a front driver's side door of the vehicle;

the second user selectable control further corresponding to a front passenger side door of the vehicle;

a third user selectable control corresponding to a rear driver's side portion of the vehicle;

a fourth user selectable control corresponding to a rear passenger's side of the vehicle; and a fifth user selectable control corresponding to a trunk of the vehicle.

17. The non-transitory computer-readable medium of claim 16, wherein:

the first user selectable control includes a graphic depiction of the front driver's side door of the vehicle;

the second user selectable control includes a graphic depiction of the front passenger side door of the vehicle;

the third user selectable control includes a graphic depiction of the rear driver's side portion of the vehicle;

the fourth user selectable control includes a graphic depiction of the rear passenger's side of the vehicle; and the fifth user selectable control includes a graphic depiction of the trunk of the vehicle.

18. The non-transitory computer-readable medium of claim 15, wherein the plurality of user selectable controls comprises:

the first user selectable control further corresponding to a passenger side of the vehicle;

the second user selectable control further corresponding to a driver's side of the vehicle; and a third user selectable control corresponding to a trunk of the vehicle.

19. The non-transitory computer-readable medium of claim 15, wherein each of the plurality of user selectable controls includes a graphic depiction of the corresponding different portion of the vehicle for that user selectable control.

20. The non-transitory computer-readable medium of claim 15, further comprising:

in response to receiving the indication of user selection of the one of the plurality of user selectable controls, changing an appearance of the one of the plurality of user selectable controls on the first user interface.

\* \* \* \* \*